US008762500B2

(12) United States Patent
Gorg et al.

(10) Patent No.: US 8,762,500 B2
(45) Date of Patent: Jun. 24, 2014

(54) NETWORK MOBILITY FOR MULTI-LEVEL NETWORKS

(75) Inventors: Camelita Gorg, Bremen (DE); Frank Pittmann, Berlin (DE); Umar Toseef, Bremen (DE); Asanga Udugama, Bremen (DE)

(73) Assignee: Nokia Solutions and Networks, Munich (DE)

( * ) Notice: Subject to any disclaimer, the term of this patent is extended or adjusted under 35 U.S.C. 154(b) by 566 days.

(21) Appl. No.: 12/991,227

(22) PCT Filed: May 30, 2008

(86) PCT No.: PCT/EP2008/056669
§ 371 (c)(1),
(2), (4) Date: Nov. 5, 2010

(87) PCT Pub. No.: WO2009/143894
PCT Pub. Date: Dec. 3, 2009

(65) Prior Publication Data
US 2011/0093571 A1    Apr. 21, 2011

(51) Int. Cl.
*G06F 15/177* (2006.01)
*H04W 8/08* (2009.01)
*H04W 8/26* (2009.01)
*H04W 80/04* (2009.01)

(52) U.S. Cl.
CPC .............. *H04W 8/082* (2013.01); *H04W 8/26* (2013.01); *H04W 8/085* (2013.01); *H04W 80/04* (2013.01)
USPC ...................................................... 709/220

(58) Field of Classification Search
CPC ....... H04W 8/082; H04W 8/26; H04W 8/085; H04W 80/04

USPC ......... 709/220, 218, 238, 242, 243, 249, 250, 709/252; 370/349, 400, 401, 255, 256
See application file for complete search history.

(56) References Cited

U.S. PATENT DOCUMENTS 7,039,035 B2 *   5/2006   Droms et al. ................. 370/338
7,577,670 B2 *   8/2009   Ho et al. .............................. 1/1

(Continued)

FOREIGN PATENT DOCUMENTS

WO    2007/145371    12/2007
WO    2008/001986    1/2008

OTHER PUBLICATIONS

V. Devarapalli et al., Network Mobility (NEMO) Basic Support Protocol, Network Working Group, RFC: 3963, Jan. 2005, a total of 21 sheets.

(Continued)

*Primary Examiner* — Huy D Vu
*Assistant Examiner* — Kuo T Chiang
(74) *Attorney, Agent, or Firm* — Squire Sanders (US) LLP

(57) ABSTRACT

There are disclosed measures of address assignment for a network element being operable in a multi-level network, comprising retrieving a network prefix of said multi-level network and network prefix information including at least one of a top-level indication, a suffix length parameter and a maximum prefix length parameter, generating a first address in accordance with a topology of said multi-level network on the basis of said retrieved network prefix and network prefix information, and assigning said generated address to an egress interface of said network element.

16 Claims, 16 Drawing Sheets

(56) References Cited

U.S. PATENT DOCUMENTS

| | | | |
|---|---|---|---|
| 8,249,086 B2* | 8/2012 | Hirano et al. | 370/401 |
| 2005/0027778 A1* | 2/2005 | Dimitrelis et al. | 709/200 |
| 2005/0099971 A1 | 5/2005 | Droms et al. | |
| 2006/0256736 A1* | 11/2006 | Koehler et al. | 370/254 |

OTHER PUBLICATIONS

C. Ng et al., Network Mobility Route Optimization Problem Statement draft-ietf-nemo-ro-problem-statement-02, NEMO Working Group, Dec. 28, 2005, a total of 18 sheets.

C. Ng et.a., Network Mobility Route Optimization Solution space Analysis draft-ietf-neuro-ro-space-analysis-02, NEMO Working Group, Feb. 10, 2006, a total of 27 sheets.

S. Deering et al., Internet Protocol, Version 6 (IPv6) Specification, Network Working Group, RFC: 2460, a total of 35 sheets, Publication date: Dec. 1998.

R. Wakikawa, Optimized Route Cache Protocol (ORC), Nov. 19, 2004, I-D Action:draft-wakikawa-nemo-orc-01.txt, a total of 2 sheets.

C. Bernardos, et al., Mobile IPv6 Route Optimisation for Network Mobility (MIRON), Jul. 13, 2005, I-D Action:draft-bernardos-nemo-miron-00.txt, a total of 2 sheets.

T. Clausen et al., Route Optimization in Nested Mobile Networks (NEMO) Using OLSR, a total of 6 sheets, Iasted International Conf. on Networks and Comm Sys (Sep. 2005).

D. Johnson et al., Mobility Support in IPv6, Network Working Group, RFC: 3775, Jun. 2004, pp. 1-165.

N. Moore, Optimistic Duplicate Address Detection (DAD) for IPv6, Network Working Group, RFC: 4429, Apr. 2006, pp. 1-17.

Hyunsik Kang et al., Route Optimization for Mobile Network, Jun. 2003, pp. 1-9.

* cited by examiner

NETWORK MOBILITY FOR MULTI-LEVEL NETWORKS

FIELD OF THE INVENTION

The present invention generally relates to network mobility for multi-level networks. In particular, embodiments of the present invention relate to the provision of network mobility in packet-switched nested network environments.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Generally, the present specification relates to mobility of elements within networks and/or communication systems, and to mobility of networks within a communication system. In this regard, by way of example only, reference will hereinafter be made to network environments based on Internet protocol (IP) schemes, as IP is currently deemed to be the most prevailing technology for today's and future communication systems, however without being restricted to the use of IP.

Mobile IP in its currently specified version MIPv6 allows an IPv6 node to maintain its existing connection on a network layer according to the ISO/OSI layer model, while it changes its location and possibly the link to which it is connected. Whenever a node changes its link, it has to get a new topologically correct IPv6 address to stay connected with a packet data network (PDN) such as the Internet. But as soon as an IP address of a node changes, all of the connections that were initiated with the previous IP address will terminate ungracefully, and the node will not be reachable with that previous IP address. However, with the help of Mobile IPv6 a node can maintain its existing connections while it is changing its location and the IP address. Mobile IPv6 accomplishes this by assigning a particular IPv6 address to the node, which is used to initiate all of the communications with that mobile node and through which the mobile node is always reachable. Mobile IPv6 actually provides survivability at the transport layer by maintaining the address at the network.

According to currently used terminology, the following terms will be used hereinafter.

A mobile node (MN) is an Internet-connected device whose location and point of attachment to the Internet (or any other PDN) may frequently be changed. A node's mobility could be a result of physical movement or of changes within the topology.

A correspondent node (CN) is a peer node with which a mobile node is communicating. The correspondent node may be either mobile or stationary.

A home address (HoA) is a relatively permanent IP address given to a mobile node. The home address remains unchanged no matter where the mobile node is located.

A Home agent is a router on a mobile node's home network that maintains information about the device's current location, as identified in its care-of address.

A home network is where a mobile device has its permanent IP address (home address).

A foreign network is any network other than the home network to which a mobile device may be connected.

A care-of-address (CoA) is a temporary IP address for a mobile node that enables message delivery when the device is connecting from somewhere other than its home network.

A binding is an association of the home address of a mobile node with a care-of address for that mobile node, along with the remaining lifetime of that association.

A binding cache is a database that is maintained both at home agent and at correspondent node and consists of binding information of mobile nodes with which they are communicating.

A binding update list is a database (maintained at a mobile node) about all bindings that the mobile node has sent to its home agent and correspondent nodes. This database helps the mobile node to keep track of the lifetime of all bindings so that they can be refreshed before they get expired.

FIG. 1 shows a basic network topology according to current Mobile IP standards.

There are specified two modes of operation of Mobile IPv6. In the first mode, all communications between a mobile node and a correspondent node takes place via a home agent. This mode of operation is called Bidirectional Tunneling. In contrast thereto, in the second mode of operation called Route Optimization, communications are carried out between a mobile node and a correspondent node without home agent's intervention. These two modes of operation are deemed to be known to the reader of the present specification, and will not be described in detail herein.

In bidirectional tunneling, it is known that due to the tunneling mechanism source and destination IP addresses of IP packets remain intact and transport layer connection can still be maintained. Whenever a mobile node makes a movement, it can register its new care-of address through a binding update message and hence can maintain its existing connections without any problem. Moreover, a mobile node is always reachable through its home address irrespective of the mobile node's actual attachment point to the Internet or any other packet data network.

Furthermore, it is deemed to be known that routing packets through a home agent by way of bidirectional tunneling will add additional delays in communication between a mobile node and a correspondent node. Another drawback of bidirectional tunneling is the introduction of a single point of failure in the network. Still another disadvantage of bidirectional tunneling is that it demands more bandwidth than is actually needed for direct communication between a mobile node and a correspondent node.

Thus, although it is not possible to keep the home agent completely out of the scene, it is preferable to avoid home agent's intervention, i.e. using route optimization. A direct communication between a mobile node and a correspondent node is possible if the home agent informs the correspondent node about the current care-of-address of the mobile node. Once a correspondent node and a mobile node are reachable for each other, they can start direct communication without home agent's involvement. The process of establishing the direct communication is called the Return Routability Procedure (RRP).

Today's widespread use of IP-based applications in portable devices implies a high demand of mobility of entire networks of IP-based devices, instead of mobility of only one node. For this purpose, Mobile IP has been extended to provide basic network mobility support under the name NEMO (Network Mobility). NEMO makes it possible for all devices in a mobile network to have uninterrupted access to a packet data network such as the Internet even when the network changes its point of attachment thereto. Similar to a single mobile node in Mobile IP, all devices in the mobile network are unaware of their network's mobility with the help of NEMO.

Though it is also possible to achieve mobility of a network without the use of NEMO, namely by enabling Mobile IP on all IP-based devices of the network, this would generate excess overheads when every device will have to perform Mobile IP functionality. NEMO actually moves the mobility functionality from a mobile node to a mobile router so that the mobile router can change its point of attachment e.g. to the Internet, which is transparent to all connected device in its mobile network.

According to currently used terminology, the following terms will be used hereinafter.

A mobile router (MR) is a router that can change its point of attachment e.g. to the Internet without disrupting higher layer connections of its attached devices.

An access router (AR) is a router that provides the PDN access to a mobile router. A mobile router usually connects to an access router over a wireless link and hence becomes a part of the network supported by that access router. All incoming and outgoing traffic of a mobile router routes through the access router.

A mobility agent (MA) is any IP device that can perform mobility functionality. It includes a mobile node as well as a home agent.

A mobile network node (MNN) is any IP device that is attached to a mobile network either on permanent basis or as a visitor. A mobile network node will not be aware of network mobility.

NEMO as currently specified works rather similar to Mobile IP.

Remember that in Mobile IP a mobile node can change its point of attachment to the Internet keeping its existing higher layer connections alive. This is achieved by sending the home agent a binding update message informing about the current location (care-of address) of its mobile node. Once the binding is complete, the home agent intercepts and forwards all traffic destined for the mobile node to the mobile node's care-of address via a tunnel, while the reverse traffic follows the same path, but in opposite direction.

NEMO is basically an extension of Mobile IP enabling an entire network to be mobile so that it can change its point of attachment e.g. to the Internet at any time. In other words, NEMO allows a mobile router to take over the role of a mobile node in performing mobility functions. All the nodes that are connected to this mobile network, termed as mobile network nodes, will neither be aware of network mobility nor are they required to perform any mobility functions themselves. A mobile router will take the responsibility for sending binding updates to their home agents. A mobile router will also send its network's prefix in the binding update so that corresponding home agents can bind an entire network to the mobile router's care-of-address and forward all packets for that network to that mobile router. A mobile router will receive all these packets via tunnels and will simply forward them to its mobile network nodes. NEMO also uses extended Mobile IP signaling messages. This extension includes e.g. a flag (R flag) to indicate that a sender of the message is a mobile router instead of a mobile node. Moreover, extended signaling also has an optional mobile network prefix field which is used to update network prefix information.

FIG. 2 schematically shows the exchange of IP traffic between a correspondent node CN and a mobile network node MNN using NEMO. All the packets from correspondent node CN to the mobile network take their path to the home agent using a standard routing mechanism. The home agent has binding information for the mobile network and hence sends all these packets via a tunnel to the respective mobile router. The tunnel has its end point at the mobile router where the packets are de-tunneled and are forwarded to mobile network node MNN using a standard routing mechanism. Conversely, the traffic that originates from mobile network nodes will take its path to the mobile router, where the packets will be tunneled to the home agent which will then perform the standard routing to forward them to the destination node CN.

According to current NEMO standardization, NEMO introduces a mobile router (MR) concept, wherein the mobile router provides for mobility for the connected mobile network nodes (MNNs) or other mobile routers (MRs), which may lead to the creation of nested structures within the moving network. All incoming and outgoing traffic of MNNs, joining a nested moving network by connecting to the nested MRs, must go through the bi-directional tunnels established between the corresponding MRs and their HAs.

As an example, it is shown in FIG. 3 how traffic of mobile router MR3 is routed via all home agents of the individual mobile routers of the nested moving network. In this way, a packet that originates from a node of MR3 will pass different networks. Namely, the traffic originating from VMR3 is tunneled and routed through home networks of all intermediate nodes. It is noted that the term "mobile router" is also referred to as Visiting Mobile Router (VMR), since these are assumed not to belong to the home network of the top-level mobile router (TLMR) of the nested structure.

Although such an arrangement allows mobile network nodes to reach and be reached ultimately by any node on the Internet or any other packet data network, a lot of problems arise for nested moving networks and their connected mobile network nodes. Such problems include, among others, problems in terms of degradation of network performance (e.g. increase of overhead due to tunneling, increase of transmission delay), problems in terms of network usage (e.g. inefficient use of costly radio resources, inefficient use of network resources), as well as problems in terms of business and administration aspects. In the latter case, an operator (e.g., in FIG. 3 the network operator of TLMR) shall have the means to mandate that all traffic related to its subscribers has to travel through its own network (i.e. through the home network) and not through the other ones (except, of course, the network at which the nodes (i.e., VMRs) are connected and the TLMR's network). This means that the traffic of each VMR goes through its home network and the home network of the TLMR. This restriction imposes the ease of charging for each packet and the deployment of network policies. This means also that the use of Mobile IP Route Optimization in nested NEMO environments is not a suitable solution to reduce the above-mentioned delay and overhead problems. Further, there remain other problems due to network policies of different operators, when processing traffic of visiting nodes (i.e., VMRs) in nested NEMO environments.

As regards the use of route optimization, besides the above, current techniques additionally suffer from the following drawbacks.

Pursuant to a proposed optimized route cache protocol (ORC), there are required significant deployment efforts for dedicated ORC routers that have to be introduced in the networks. Furthermore, such a proposal lacks a routing algorithm and an address management scheme in the moving network.

Pursuant to a proposed Mobile IPv6 route optimization for network mobility (MIRON), there is introduced a new network entity called MAR (MIRON Access Router) in a moving network, thus resulting in inflexibility for a moving network and increasing the complexity of acquiring addresses. Furthermore, such a proposal mandates that a mobile router must maintain state information of every route optimization session for each mobile network node which it serves.

Pursuant to a proposed route optimization in nested mobile network (NEMO) using the optimized link state routing protocol (OLSR), there is not specified any address assignment and/or how to deliver incoming packets.

Pursuant to a proposed packet delivery mechanism between local nodes of the same moving network, local nodes (i.e., local mobile nodes) are of interest and routing in this regard can be seen for outgoing packets sent from local nodes inside the moving network and destined to a another local node that left the same moving network (regardless of whether the moving network is nested or not).

Accordingly, there does not exist any feasible solution to the above drawbacks and problems with respect to network mobility, in particular with respect to network mobility in multi-level networks.

SUMMARY OF EMBODIMENTS OF THE INVENTION

The present invention and its embodiments are made to address one or more of the above-described drawbacks. Thus, the present invention and its embodiments are intended to mitigate drawbacks in network mobility.

According to exemplary aspects of the present invention, there are disclosed: methods; apparatuses; and computer program products, as set out in the appended claims.

According to one exemplary aspect of the present invention, there is provided a method of address assignment for a network element being operable in a multi-level network, comprising retrieving a network prefix of said multi-level network and network prefix information including at least one of a top-level indication, a suffix length parameter and a maximum prefix length parameter, generating a first address in accordance with a topology of said multi-level network on the basis of said retrieved network prefix and network prefix information, and assigning said generated address to an egress interface of said network element.

According to further developments or modifications thereof, one or more of the following applies:
the method further comprises detecting, on the basis of said retrieved top-level indication, whether or not said network element is dedicated as a top-level network element of said multi-level network,
if said network element is not dedicated as a top-level network element of said multi-level network, said first address generating further comprises building an interface identifier of said egress interface, and concatenating said built egress interface identifier and said retrieved network prefix,
said building of said egress interface identifier comprises generating a random number of a length according to said retrieved suffix length parameter, generating a string of zero values of a length according to a predetermined address length, a length of said retrieved network prefix and said retrieved suffix length parameter, and appending said generated random number to said generated string of zero values,
the method further comprises determining, on the basis of a length of said retrieved network prefix and said retrieved maximum prefix length parameter, whether or not said network element is dedicated as a bottom-level network element of said multi-level network, if said network element is not dedicated as a bottom-level network element of said multi-level network, said method further comprises generating a second address in accordance with a topology of said multi-level network on the basis of said retrieved network prefix and network prefix information, and assigning said generated address to an ingress interface of said network element,
said second address generating further comprises building an interface identifier of said ingress interface, said ingress interface identifier having a predetermined value, creating another network prefix of a length according to a length of said retrieved network prefix and said retrieved suffix length parameter e.g. by appending a random number previously generated for egress interface address assignment to said retrieved network prefix, and concatenating said built egress interface identifier and said created other network prefix,
the method further comprises advertising said address assigned to said egress interface from said network element to an upper-level network element via said egress interface e.g. by sending an unsolicited neighbor advertisement message containing said assigned egress interface address,
the method further comprises advertising said address assigned to said ingress interface from said network element to at least one lower-level network element via said ingress interface e.g. by sending a router advertisement message containing said assigned ingress interface address, another network prefix, and network prefix information including said retrieved top-level indication, a suffix length parameter and a maximum prefix length parameter,
if said network element is dedicated as a top-level network element of said multi-level network, said first address generating is based on a stateless auto-address configuration procedure,
the method further comprises generating a second address in accordance with a topology of said multi-level network on the basis of said retrieved network prefix, and assigning said generated address to an ingress interface of said network element,
said second address generating further comprises building an interface identifier of said ingress interface, said ingress interface identifier having a predetermined value, concatenating said built ingress interface identifier and said retrieved network prefix,
said retrieving comprises obtaining said retrieved network prefix from configuration data of said network element,
the method further comprises advertising said address assigned to said ingress interface from said network element to at least one lower-level network element via said ingress interface, and/or
said advertising comprises setting a top-level indication dedicating said network element as top-level network element of said multi-level network, and sending a router advertisement message containing said assigned ingress interface address, said retrieved network prefix, and network prefix information including said set top-level indication, and a suffix length parameter as well as a maximum prefix length parameter according to configuration data of said network element.

According to one exemplary aspect of the present invention, there is provided an apparatus comprising means for retrieving a network prefix of a multi-level network and network prefix information including at least one of a top-level indication, a suffix length parameter and a maximum prefix length parameter, means for generating a first address in accordance with a topology of said multi-level network on the basis of said retrieved network prefix and network prefix information, and means for assigning said generated address to an egress interface of said apparatus.

According to further developments or modifications thereof, one or more of the following applies:

the apparatus further comprises means for detecting, on the basis of said retrieved top-level indication, whether or not said apparatus is dedicated as a top-level apparatus of said multi-level network, if said apparatus is not dedicated as a top-level apparatus of said multi-level network, said first address generating means further comprises means for building an interface identifier of said egress interface, and means for concatenating said built egress interface identifier and said retrieved network prefix, said building means of said egress interface identifier comprises means for generating a random number of a length according to said retrieved suffix length parameter, means for generating a string of zero values of a length according to a predetermined address length, a length of said retrieved network prefix and said retrieved suffix length parameter, and means for appending said generated random number to said generated string of zero values, the apparatus further comprises means for determining, on the basis of a length of said retrieved network prefix and said retrieved maximum prefix length parameter, whether or not said apparatus is dedicated as a bottom-level apparatus of said multi-level network, if said apparatus is not dedicated as a bottom-level apparatus of said multi-level network, said apparatus further comprises means for generating a second address in accordance with a topology of said multi-level network on the basis of said retrieved network prefix and network prefix information, and means for assigning said generated address to an ingress interface of said apparatus, said second address generating means further comprises means for building an interface identifier of said ingress interface, said ingress interface identifier having a predetermined value, means for creating another network prefix of a length according to a length of said retrieved network prefix and said retrieved suffix length parameter, and means for concatenating said built egress interface identifier and said created other network prefix, wherein said creating means e.g. comprises means for appending a random number previously generated for egress interface address assignment to said retrieved network prefix, the apparatus further comprises means for advertising said address assigned to said egress interface from said apparatus to an upper-level apparatus via said egress interface e.g. by sending an unsolicited neighbor advertisement message containing said assigned egress interface address, the apparatus further comprises means for advertising said address assigned to said ingress interface from said apparatus to at least one lower-level apparatus via said ingress interface e.g. by sending a router advertisement message containing said assigned ingress interface address, another network prefix, and network prefix information including said retrieved top-level indication, a suffix length parameter and a maximum prefix length parameter, if said apparatus is dedicated as a top-level apparatus of said multi-level network, said first address generating means is configured to generate said first address based on a stateless auto-address configuration, the apparatus further comprises means for generating a second address in accordance with a topology of said multi-level network on the basis of said retrieved network prefix, and means for assigning said generated address to an ingress interface of said apparatus, said second address generating means further comprises means for building an interface identifier of said ingress interface, said ingress interface identifier having a predetermined value, means for concatenating said built ingress interface identifier and said retrieved network prefix, said retrieving means comprises means for obtaining said retrieved network prefix from configuration data of said apparatus, the apparatus further comprises means for advertising said address assigned to said ingress interface from said apparatus to at least one lower-level apparatus via said ingress interface, said advertising means comprises means for setting a top-level indication dedicating said apparatus as top-level apparatus of said multi-level network, and means for sending a router advertisement message containing said assigned ingress interface address, said retrieved network prefix, and network prefix information including said set top-level indication, and a suffix length parameter as well as a maximum prefix length parameter according to configuration data of said apparatus, said apparatus is operable as a network element in said multi-level network, and/or said apparatus is a mobile router.

According to one exemplary aspect of the present invention, there is provided a computer program product comprising program code means being arranged, when run on a processor of an apparatus, to perform the processes according to any one of the above-mentioned methodic aspects, developments and modifications.

According to one exemplary aspect of the present invention, there is provided a method for a network element being operable in a multi-level network, comprising retrieving network prefix information including a maximum prefix length parameter and a suffix length parameter of a network prefix of said multi-level network, confirming that a network prefix length of an address of an ingress interface of said network element is smaller than said maximum prefix length, receiving an advertisement of an address of an egress interface of a lower-level network element of said multi-level network, and configuring a routing table on the basis of said received egress interface address and said retrieved suffix length parameter.

According to further developments or modifications thereof, one or more of the following applies:

said configuring comprises calculating a length parameter on the basis of the network prefix length of the ingress interface address of said network element and said suffix length parameter, and adding and/or updating a routing table entry specifying that traffic having the received egress interface address as a network prefix of a length corresponding to said calculated length is to be routed to said received egress interface address via said ingress interface of said network element, and/or the method further comprises informing network elements not being dedicated as top-level or bottom-level network elements of said multi-level network to forward any traffic on their ingress interface having a source address from a network prefix of said multi-level network to their egress interface and not to tunnel such traffic.

According to one exemplary aspect of the present invention, there is provided an apparatus being operable in a multi-level network, comprising means for retrieving network prefix information including a maximum prefix length parameter and a suffix length parameter of a network prefix of said multi-level network, means for confirming that a network prefix length of an address of an ingress interface of said apparatus is smaller than said maximum prefix length, means for receiving an advertisement of an address of an egress interface of a lower-level apparatus of said multi-level network, and means for configuring a routing table on the basis of said received egress interface address and said retrieved suffix length parameter.

According to further developments or modifications thereof, one or more of the following applies:
  said configuring means comprises means for calculating a length parameter on the basis of the network prefix length of the ingress interface address of said apparatus and said suffix length parameter, and means for adding and/or updating a routing table entry specifying that traffic having the received egress interface address as a network prefix of a length corresponding to said calculated length is to be routed to said received egress interface address via said ingress interface of said apparatus, and/or
  the apparatus further comprises means for informing apparatuses not being dedicated as top-level or bottom-level apparatuses of said multi-level network to forward any traffic on their ingress interface having a source address from a network prefix of said multi-level network to their egress interface and not to tunnel such traffic.

According to one exemplary aspect of the present invention, there is provided a computer program product comprising program code means being arranged, when run on a processor of an apparatus, to perform the processes according to any one of the above-mentioned methodic aspects, developments and modifications.

According to non-limiting embodiments of the present invention, there is provided an efficient address assignment mechanism for specifying hierarchical, topologically correct addresses for mobile network nodes connecting to a top-level mobile router or (nested) mobile routers based on a particular network prefix which is used to assign addresses to its mobile routers and/or mobile network nodes in a hierarchical way. The thus provided hierarchical address assignment mechanism makes routing within a mobile/moving network (such as e.g. a personal area network) possible.

According to non-limiting embodiments of the present invention, there are provided extended functionalities for mobile routers (i.e. top-level mobile routers and intermediate-level mobile routers) and mobile network nodes. The thus provided functionalities are for coping with extended MIP/NEMO signaling (e.g. extended Router Advertisement (RA) message) with modified prefix information.

According to non-limiting embodiments of the present invention, unnecessary tunneling and traversing through home networks of all mobile routers is avoided, which exist in a path from a nested node up to a top-level mobile router. With the provided mechanism, traffic of a nested node will have to traverse only through the top-level mobile router's home network.

According to non-limiting embodiments of the present invention, intermediate nodes (e.g. of a nested mobile/moving network) are informed not to tunnel any traffic, which arrives at their ingress interface and has a source address from a certain network prefix of that network, but rather to forward it to their egress interface and so on until it reaches a top-level mobile router. When this traffic reaches a top-level mobile router, it forwards this traffic to its home agent, where it takes its route towards the desired destination by standard routing mechanisms.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

The present invention is described herein with reference to particular non-limiting examples. A person skilled in the art will appreciate that the invention is not limited to these examples, and may be more broadly applied.

In particular, the present invention and its embodiments is mainly described in relation to nested networks, i.e. multi-level networks comprising mobile routers and nodes on different hierarchical levels, which may be defined according to 3GPP or IETF specifications, used as a non-limiting example for a network configuration. As such, the description of the embodiments given herein specifically refers to terminology which is directly related thereto. Furthermore, the present invention and its embodiments are mainly described in relation to IP-based technology, although any kind of transport technology may be applicable. Respective terminology is only used in the context of the presented non-limiting examples, and does naturally not limit the invention in any way. Rather, any other technological background of networks and/or transport technology may as well be applied as long as compliant with the described features and/or principles.

According to a facet of the present invention, embodiments thereof relate to an efficient address assignment for assigning topologically correct addresses for network elements (i.e. VMRs and VMNs) connecting to a top-level network element (i.e. TLMR) or nested network elements (i.e. MRs). According to another facet of the present invention, embodiments thereof relate to an efficient routing by avoiding unnecessary tunneling and network traversing.

Figure 4:
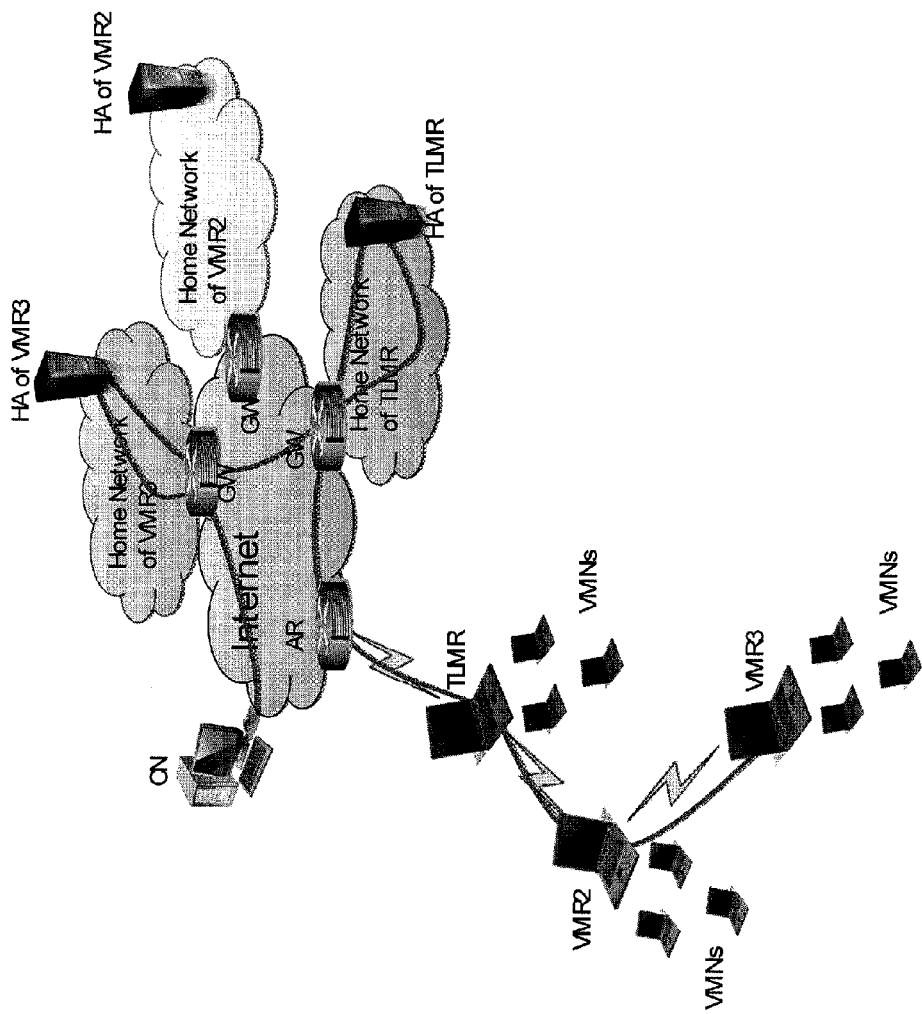
FIG. 4 illustrates how traffic of a mobile router is routed via home agents of a nested moving network environment, when an embodiment of the present is applied.

FIG. 4 shows a network environment and a routing scenario, in which an embodiment of the present invention is applied. Namely, it illustrates how traffic of a mobile router is routed via home agents of a nested moving network environment, when an embodiment of the present is applied.

Figure 1:
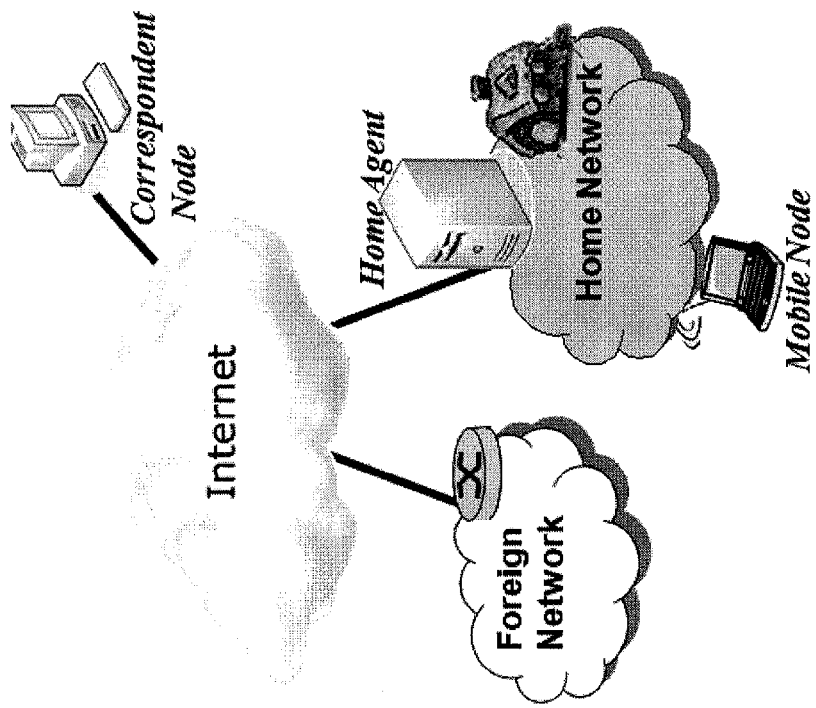
FIG. 1 shows a basic network topology according to current Mobile IP standards, FIG. 2 schematically shows the exchange of IP traffic between a correspondent node and a mobile network node using network mobility.
Figure 2:
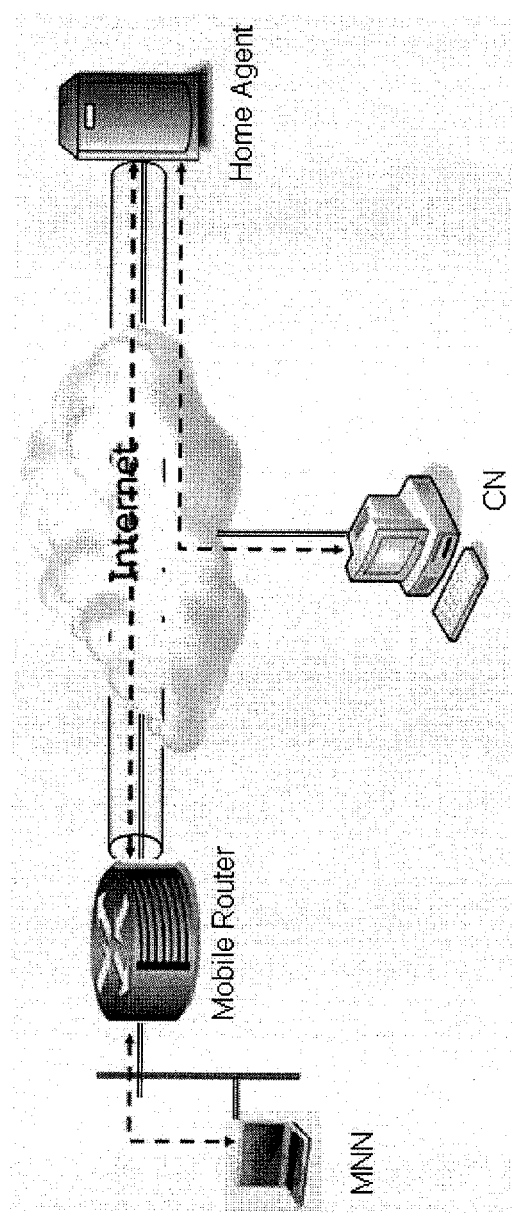
Figure 3:
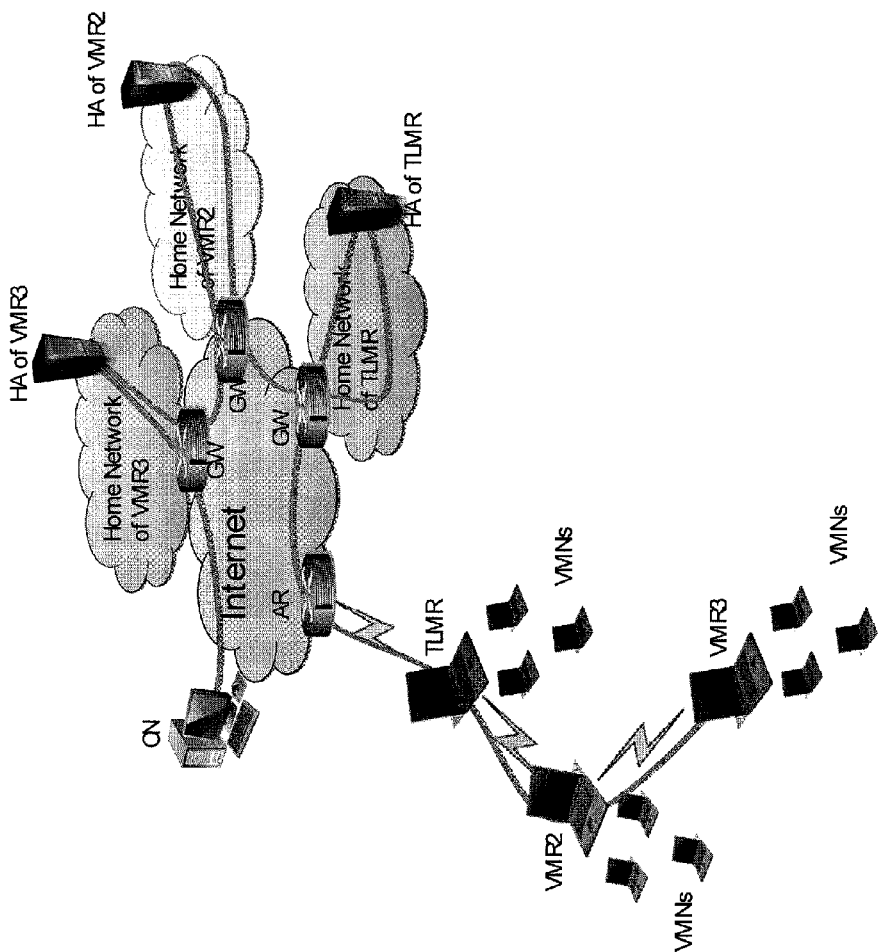
FIG. 3 illustrates how traffic of a mobile router is routed via all home agents of the mobile routers of a nested moving network environment.

According to FIG. 4, it may be seen that an application of an embodiment of the present invention avoids that traffic from mobile router VMR3 is unnecessarily tunneled and routed (traversed) through the home networks (via the home agent) of all intermediate nodes in the nested network existing in the path from the nested network elements up to the TLMR, i.e. VMR2 and TLMR, as is the case in the scenario of FIG. 3.

The proposed solution according to one example is based on an address assignment mechanism that specifies a hierarchical address assignment. To this end, a top-level network element in a nested network, i.e. TLMR of FIG. 4, has a particular network prefix which will be used to assign addresses to its lower-level network elements, i.e. VMRs, in a hierarchical way. The proposed network prefix for VMRs, the so-called 'VMN/VMR network prefix', may be topologically anchored at the home agent of the top-level network element TLMR. Hence, this home agent is responsible for forwarding all traffic with destination address from that particular network prefix, i.e. from within the network served by TLMR, to the TLMR when the TLMR is in a foreign network or in the home network. Hence, traffic of a nested network element traverses only through the TLMR's home network (and of course through the MR's home network to which the nested network element is directly connected). This may for example be achieved by informing intermediate nodes (e.g. by means of an extended Router Advertisement message) not to tunnel any traffic, which arrives at their ingress interface and has a source address of the corresponding network prefix, but rather to forward it to their egress interface and so on until it reaches the TLMR. When this traffic reaches the TLMR, it forwards this traffic to its own home agent, where it takes its route towards the desired destination by standard routing mechanisms.

In detail, when sending traffic from nested network elements, after getting a globally routable address, a nested network element can start using that address as its source address. All intermediate nodes up to the TLMR should forward their incoming traffic (from VMNs and/or VMRs) to their egress interface connected to the network element in the upper nested level until this traffic reaches the TLMR. The TLMR will tunnel this traffic to its home agent. The home agent de-tunnels the packets and sends them (via respective gateways GW between individual networks) towards the respective home agent of the sending network element, which de-tunnels and forwards the traffic to the final destination using standard IP routing mechanisms.

In detail, when receiving traffic at nested network elements, if any network element e.g. in the Internet wants to communicate with a nested network element, it sends IP packets to the destination address which has been acquired by that nested network element. Using standard routing mechanisms, these packets will reach the home agent of the TLMR. This is because the nested network elements' (i.e., VMRs' and VMNs') addresses are derived from the VMN/VMR network prefix topologically anchored at the TLMR's home agent. The home agent captures the packets and sends them to the TLMR at its current care-of-address using a standard IPv6 over IPv6 tunneling mechanism. Once they reach the TLMR, these packets will be de-tunneled and forwarded to the nested network elements. At this point, the routing mechanism will benefit from hierarchically assigned and topologically correct addresses and up-to-date routing tables, which may be updated by way of Unsolicited Neighbor Advertisement messages periodically sent from network elements joining the nested network. This in turn enables the routing to all nested network elements.

Figure 5:
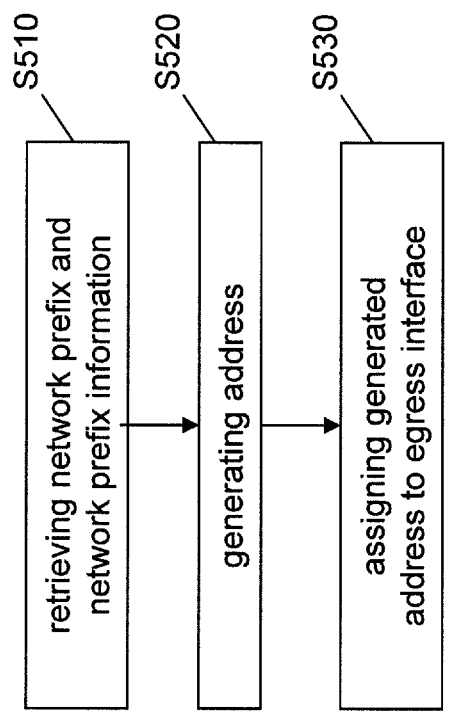
FIG. 5 shows a flow diagram of a generic method of address assignment according to an embodiment of the present invention.

FIG. 5 shows a flow diagram of a generic method of address assignment according to an embodiment of the present invention. This method is for assigning an address at an egress interface of a network element being operable in a multi-level network, i.e. a nested network.

According to the thus depicted embodiment, a network prefix and network prefix information are retrieved in operation S510. The thus retrieved network prefix information includes at least one of a top-level indication (e.g. a t-flag in a Router Advertisement message), a suffix length parameter (e.g. a SuffixLength field in a Router Advertisement message) and a maximum prefix length parameter (e.g. a MaxPrefixLength field in a Router Advertisement message). In operation S520, a (unicast) address (e.g. an IPv6 address) in accordance with the topology of the underlying nested network is generated on the basis of the retrieved network prefix and network prefix information. Then, in operation S530, the thus generated address is assigned to the egress interface of the network element, i.e. to the interface to a lower level of the nested network.

Figure 6:
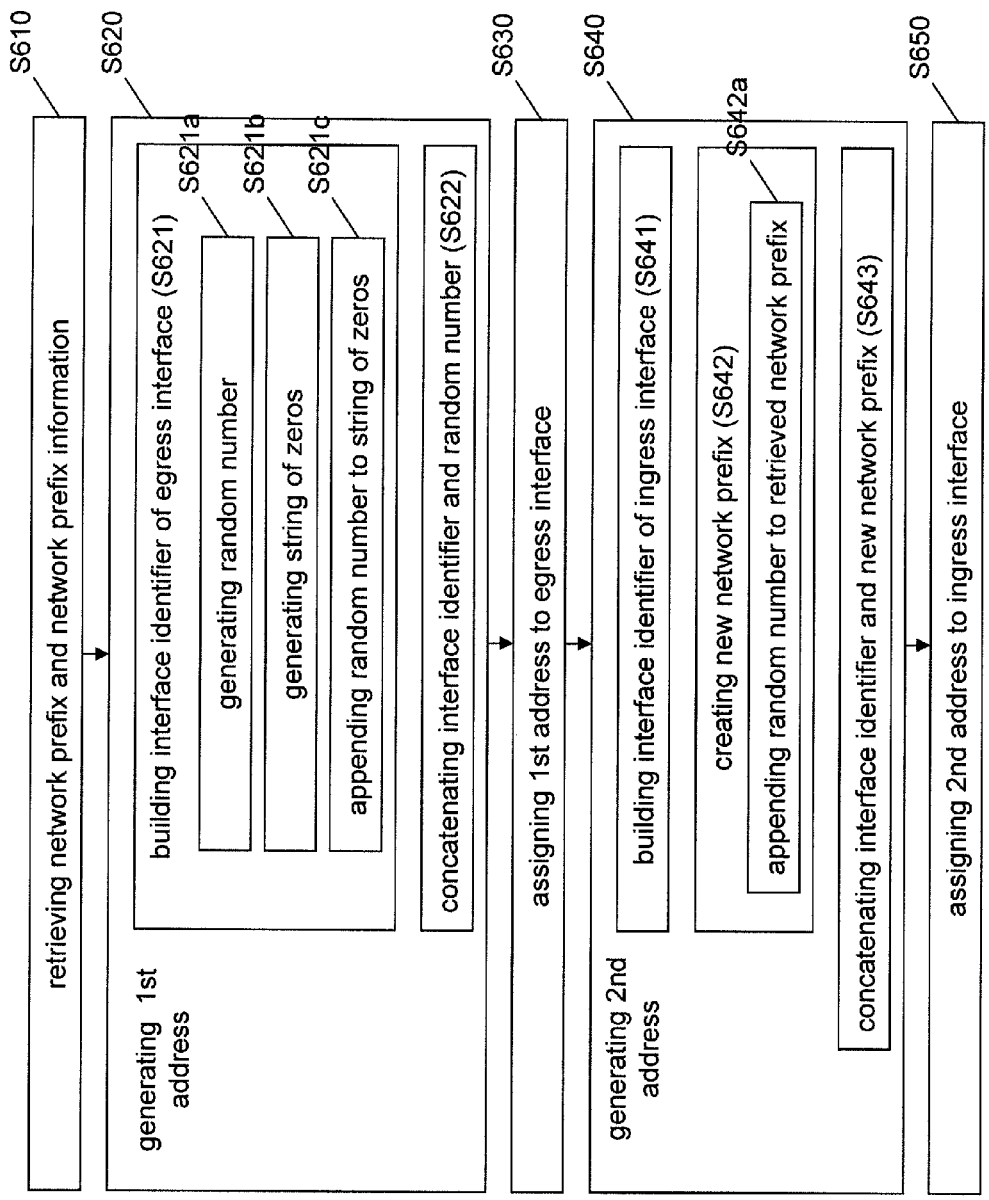
FIG. 6 shows a flow diagram of a method of address assignment of an intermediate-level network element according to an embodiment of the present invention.

FIG. 6 shows a flow diagram of a method of address assignment of an intermediate-level network element according to an embodiment of the present invention. The method of FIG. 6 is based on that of FIG. 5, but is illustrated in more detail. This method may be carried out at a mobile router or mobile network node according to FIG. 4, which is not a top-level network element (e.g. TLMR). A corresponding detection (not shown) may be based on the retrieved top-level indication. Further, it is assumed that this method is carried out at a network element which is not at the bottom-level of the nested network. A corresponding determination (not shown) may be based on a length of the retrieved network prefix and the retrieved maximum prefix length parameter indicating the depth of the nested network. If this method was carried out at a bottom-level network element, the flow would terminate with operation S630.

According to the thus depicted embodiment, a network prefix and network prefix information are retrieved in operation S610. The retrieving may be effected by receiving a Router Advertisement message containing a t-flag, a SuffixLength field and a MaxPrefixLength field via the egress interface. In operation S620, a (unicast) address is generated based on the retrieved network prefix and network prefix information. In detail, the address generation in operation S620 comprises an operation of building an interface identifier of the egress interface (S621) and an operation of concatenating the thus built interface identifier of operation S621 and the previously retrieved network prefix of operation S610 (S622). According to the depicted embodiment, the interface identifier building of operation S621 comprises an operation of generating a random number of a length according to the value of retrieved suffix length parameter and having a value $\epsilon[2; (2\char`\^SuffixLength-1)]$ (S621a), an operation of generating a string of zero values of a length according to a predetermined address length (e.g. 128 bits for IPv6), a length of the retrieved network prefix and a value of the retrieved suffix length parameter (S621b), and an operation of appending the generated random number to the generated string of zeros (S621c), i.e. a concatenation thereof. In view of an exemplary Router Advertisement message as mentioned above, the length of the random number may be equal to SuffixLength bits, the length of the string of zeros may be equal to 128-PrefixLength-SuffixLength bits, and the length of the thus generated interface identifier may be equal to 128-prefixLength bits. Then, in operation S630, the thus generated address of a length e.g. of 128 bits is assigned to the egress interface of the network element.

As the network element is not at the bottom level, i.e. the length of the retrieved network prefix is smaller than the value of the maximum prefix length parameter, the flow proceeds with an assignment of an ingress interface address.

Namely, in operation S640, a further (unicast) address is generated in accordance with the topology of the nested network and on the basis of the retrieved network prefix and network prefix information, and in operation S650, the thus generated address is assigned to the ingress interface of the network element. In detail, the address generation in operation S640 comprises an operation of building an interface identifier of the ingress interface (S641), an operation of creating a new network prefix (S642), and an operation of concatenating the thus built interface identifier of operation S641 and the thus created new network prefix of operation S642 (S643). The interface identifier may be built by specifying a predetermined value, e.g. a value of 1 (i.e. a string of a predetermined number of zeros and a single 1 at the least significant bit). The creation of the new network prefix may in to the depicted embodiment be based on a length of the earlier retrieved network prefix and the retrieved suffix length parameter, e.g. in that the random number generated in operation S621a is appended to (i.e. concatenated with) the earlier retrieved network prefix of operation S610. In view of an exemplary Router Advertisement message as mentioned above, the length of the random number may be equal to SuffixLength bits, and the length of the new network prefix may be equal to PrefixLength+SuffixLength bits. Then, in operation S650, the thus generated address of a length e.g. of 128 bits is assigned to the ingress interface of the network element.

Although not illustrated in FIG. 6, a method according to an embodiment of the present invention also comprises at least one of two advertising operations. On the one hand, after assignment of the egress interface address in step S630, the network element then advertises the thus assigned address to an upper-level network element via the egress interface. This advertising may be effected by means of an Unsolicited Neighbor Advertisement message, as exemplarily depicted in FIG. 8 from mobile router MR1 of nested level 1 to top-level mobile router TLMR, and from mobile router MR2 of nested level 2 to mobile router MR1 of nested level 1. On the other hand, after assignment of the ingress interface address in step S650, the network element then advertises the thus assigned address to a lower-level network element via the ingress interface. This advertising may be effected by means of a Router Advertisement message, as exemplarily depicted in FIG. 8 from mobile router MR1 of nested level 1 to mobile router MR2 of nested level 2. The thus sent Router Advertisement message may be constructed as detailed below.

Further, although not shown in FIG. 6, method according to an embodiment of the present invention also comprises an operation of verifying the uniqueness of the address generated for assignment to the egress interface of the network element, i.e. between operations S620 and S630 of FIG. 6. Such a verifying may for example be accomplished by using a duplicate address detection (DAD) technique. In case the DAD fails, the network element generates another address, mainly by drawing another random number in operation S621a, which will then again be verified for uniqueness, e.g. by DAD.

Figure 7:
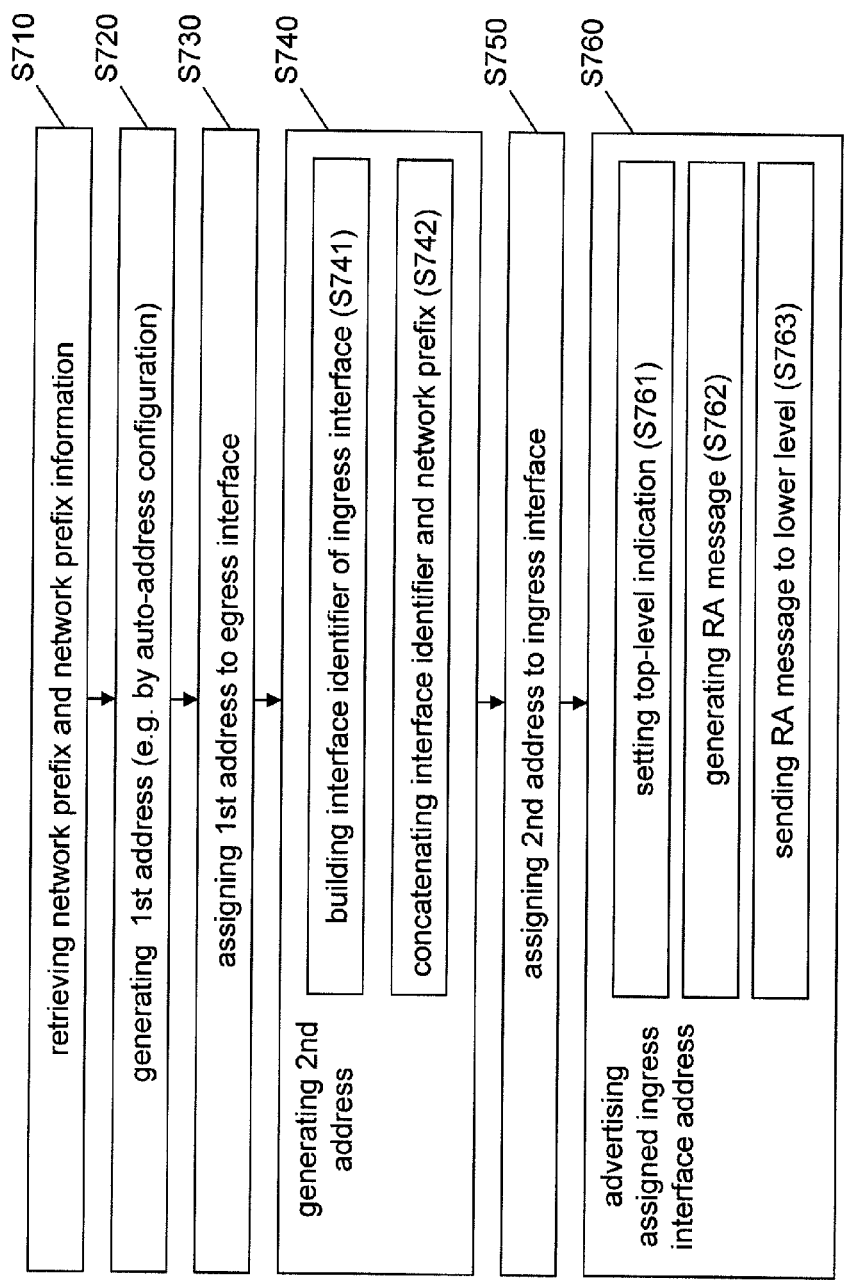
FIG. 7 shows a flow diagram of a method of address assignment of a top-level network element according to an embodiment of the present invention.

FIG. 7 shows a flow diagram of a method of address assignment of a top-level network element according to an embodiment of the present invention. The method of FIG. 7 is based on that of FIG. 5, but is illustrated in more detail. This method may be carried out at a top-level mobile router TLMR according to FIG. 4. A corresponding detection (not shown) may be based on the retrieved top-level indication.

According to the thus depicted embodiment, a network prefix and network prefix information are retrieved in operation S710. The retrieving may be effected by obtaining this information (i.e. network prefix, possibly allocated earlier e.g. by a packet data network gateway) from configuration data of the network element. In operation S720, a first (unicast) address is generated by a standard stateless auto-address configuration procedure, which is then assigned to the egress interface in operation S730. In operation S740, a second (unicast) address is generated in accordance with the topology of the underlying nested network and on the basis of the retrieved network prefix, which is then assigned to the ingress interface in operation S750. According to the present embodiment as depicted, the second address generation operation in S740 comprises an operation of building an interface identifier of the ingress interface (S741), and an operation of concatenating the thus built ingress interface identifier of operation S741 and the retrieved network prefix of operation S710. The interface identifier may be built by specifying a predetermined value, e.g. a value of 1 (i.e. a string of a predetermined number of zeros and a single 1 at the least significant bit). In contrast to the method of FIG. 6, an advertising operation for advertising the thus assigned ingress interface address to lower-level network elements is depicted in operation S760. According to the present embodiment as depicted, such an advertising operation comprises an operation of setting a top-level indication such that it dedicates the present network element as top-level network element, i.e. the receiving network elements as intermediate-level network elements (S761). This may e.g. be effected by setting a t-flag of a Router Advertisement message as described below to 1. Further, in operation S762, a corresponding Router Advertisement message may be generated as detailed below, e.g. so that it contains the assigned ingress interface address, the retrieved network prefix, the set top-level indication as well as a suffix length parameter and a maximum prefix length parameter according to configuration data of the present network element (or the underlying nested network). Such an advertising (i.e. sending of an accordingly generated RA message, cf. operation S763) is exemplarily depicted in FIG. 8 from top-level mobile router TLMR to mobile router MR1 of nested level 1. As mentioned above, the thus sent Router Advertisement message may be constructed as detailed below.

Figure 8:
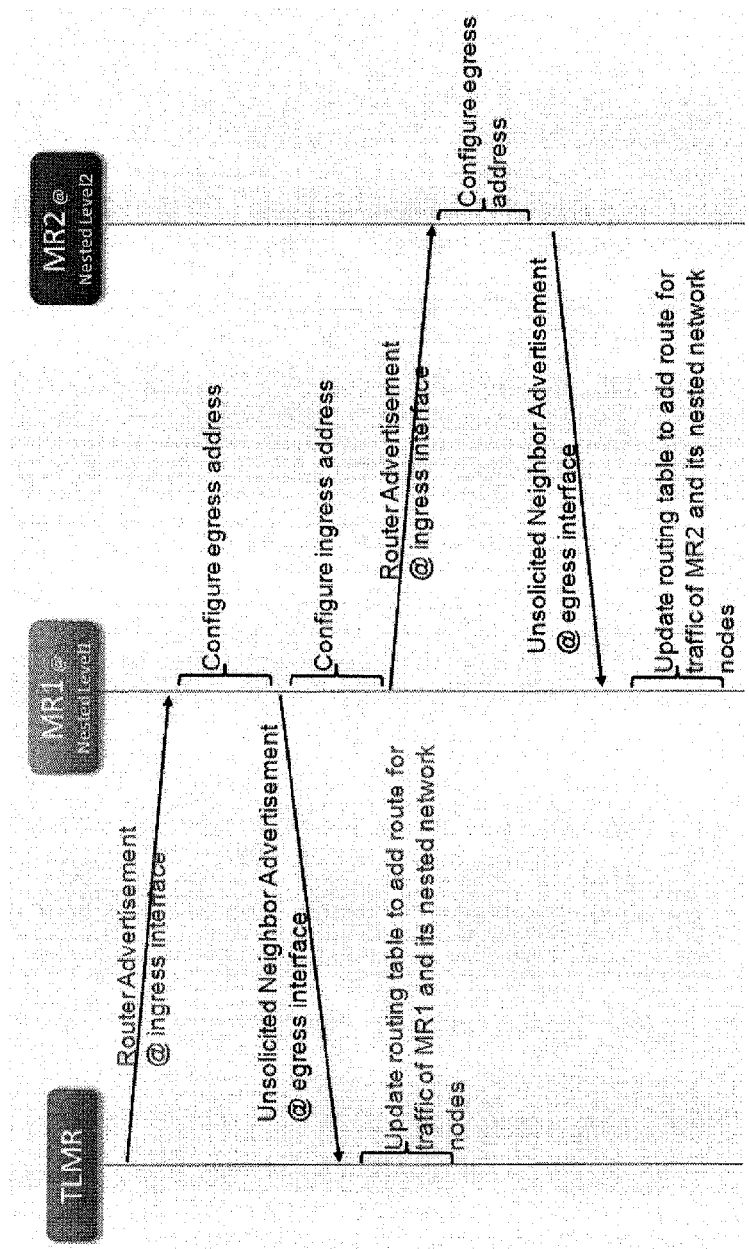
FIG. 8 shows a signaling diagram of an exemplary message exchange in a nested moving network environment, when an embodiment of the present is applied.

FIG. 8 shows a signaling diagram of an exemplary message exchange in a nested moving network environment, when an embodiment of the present invention is applied. It may be seen that the top-level mobile router TLMR does not explicitly assign an address to its egress interface, but to its ingress interfaces, and advertises the same to the lower-level network element(s). Mobile router MR1 of nested level 1 assigns an address both to its ingress interface and its egress interface, and advertises these to lower-level mobile router MR2 and higher-level mobile router TLMR, respectively. The network element of the lowest level in this example scenario, i.e. mobile router MR of nested level 2 assigns an address to its egress interface only, and advertises the address to the higher-level network element MR1.

Figure 9:
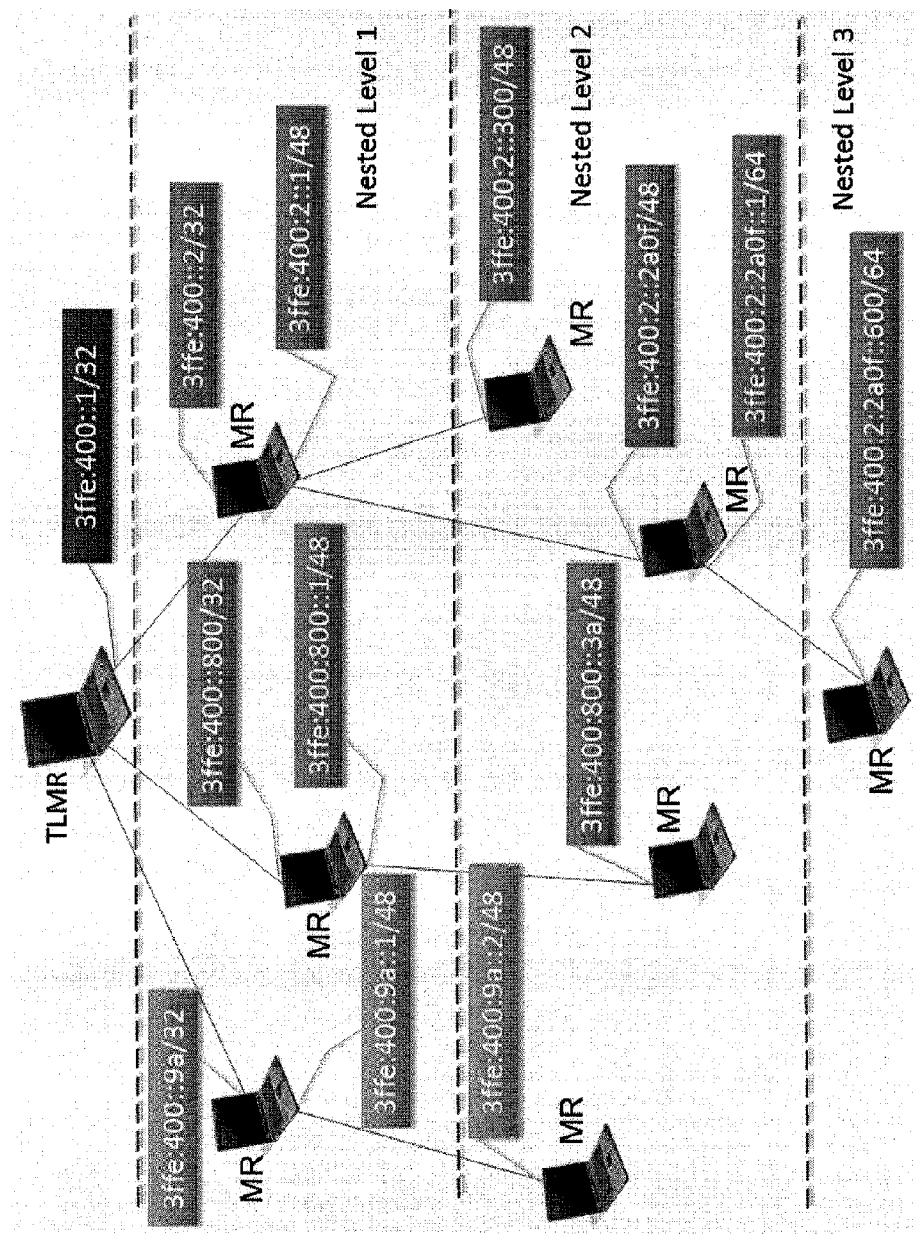
FIG. 9 shows an exemplary topology of a nested network environment with addresses assigned in accordance with an embodiment of the present invention.

FIG. 9 shows an exemplary topology of a nested network environment with addresses assigned in accordance with above-described methods.

In detail, the TLMR on the highest level has a particular network prefix (e.g. being allocated by a PDN gateway or access router), in this case 3ffe::400. In order to avoid routing problems, the address assignment is done in a hierarchal order. For this purpose, the VMR/VMN network prefix is distributed among MRs (and its VMNs) on each level of hierarchy to generate a given number of addresses. In the present example, it is supposed that the TLMR has been allocated with a VMR network prefix of length 32 e.g. 3ffe: 400::/32. The TLMR decides to assign 16 bits to each level of hierarchy. Moreover it wants to support a nested network up to three levels. Due to 16 bits being assigned to each nested level, there can be around $2^{16}$ nodes in each level of hierarchy.

In this example, an exemplary address assignment scheme according to an embodiment of the present invention runs as follows.

The TLMR network element will propagate the VMR/VMN network prefix-related information to the nodes in Nested Level 1 of the nested network. This information may include the VMR/VMN network prefix to configure a stateless address;

address configuration scheme to generate an address from the given network prefix; and rules to propagate this information to next level of the nested network.

An extended Router Advertisement message as detailed below can be used to carry this information.

In order to avoid unnecessary nested tunneling, the VMRs propagate the VMR/VMN network prefix information received from an upper VMR to the VMRs (and finally also to the VMNs) in the lower level. This action is required only, if a node allows its VMRs to connect to it to make a further level in the nested network. In order to generate a (unicast) address from a given VMR/VMN network prefix, a node (i.e., VMR or VMN) needs to build an interface identifier dynamically. This interface identifier has to have sufficient length to make a 128 bit long IPv6 address when concatenated to the advertised network prefix. The dynamic generation of interface identifier involves the knowledge of a number leading bits in the interface identifier which must be set to zero, while rest of the bits will be given a value by drawing a random number. For example if a node receives a network prefix 3ffe:400::/32 (of length 32) from an upper node and it is allowed to have a maximum of 16 trailing bits of the interface identifier to be non-zero, this information tells the receiver that it will have to dynamically generate an interface identifier of length 128−32=96 bits, whose 16 trailing bits may have non-zero values. This node will draw a random number that lies between 1-to-$2^{16}$ to give a value to the 16 trailing bits. Assuming that this random number is 0x0800, then the generated dynamic prefix will be 0x0000:0000:0000:0000:0000:0800, and when concatenated to the network prefix the new address will be 3ffe:0400:0:0:0:0:0:0800 or 3ffe:400::800. After successfully configuring the egress interface address, the node sends an Unsolicited Neighbor Advertisement to an 'all node' multicast address. This will help receiving nodes to add/update a route in their routing table for traffic destined to them or their nested networks. These Unsolicited Neighbor Advertisement messages may be sent by all nodes in the nested network regularly at an appropriate time rate to avoid neighbor cache get staled.

If a node wants to propagate network prefix information to the nodes in AN immediate lower nested level, it will have to generate a new network prefix to advertise. This new network prefix can be achieved by appending a given number of bits to the received network prefix which results in a longer network prefix. The appended bits will be given the value of random number that was drawn earlier to construct a unique address from received network prefix over the egress interface. In the above-given example, this new network prefix advertised to the next level will be 3ffe:400:800::/48 (of length 48). Hence, the new network prefix length to be advertised to the next level is increased by the count equal to the added number of bits to the received network prefix. Once a new network prefix is constructed, the network interface which advertises that new network prefix will be assigned an address derived from new network prefix.

For this purpose, another dynamic interface identifier of an appropriate length will be generated which will have all of its bits set to zero except the last bit. The generated dynamic interface identifier will then be concatenated to the new network prefix to make an address. For example, if the new network prefix is 3ffe:400:800::/48 then the constructed address should be 3ffe:400:800::1. There is no need to verify the uniqueness of the generated address because by rule, no other node is allowed to have this address.

FIG. 9 depicts the situation when address assignment is completed.

Figure 10:
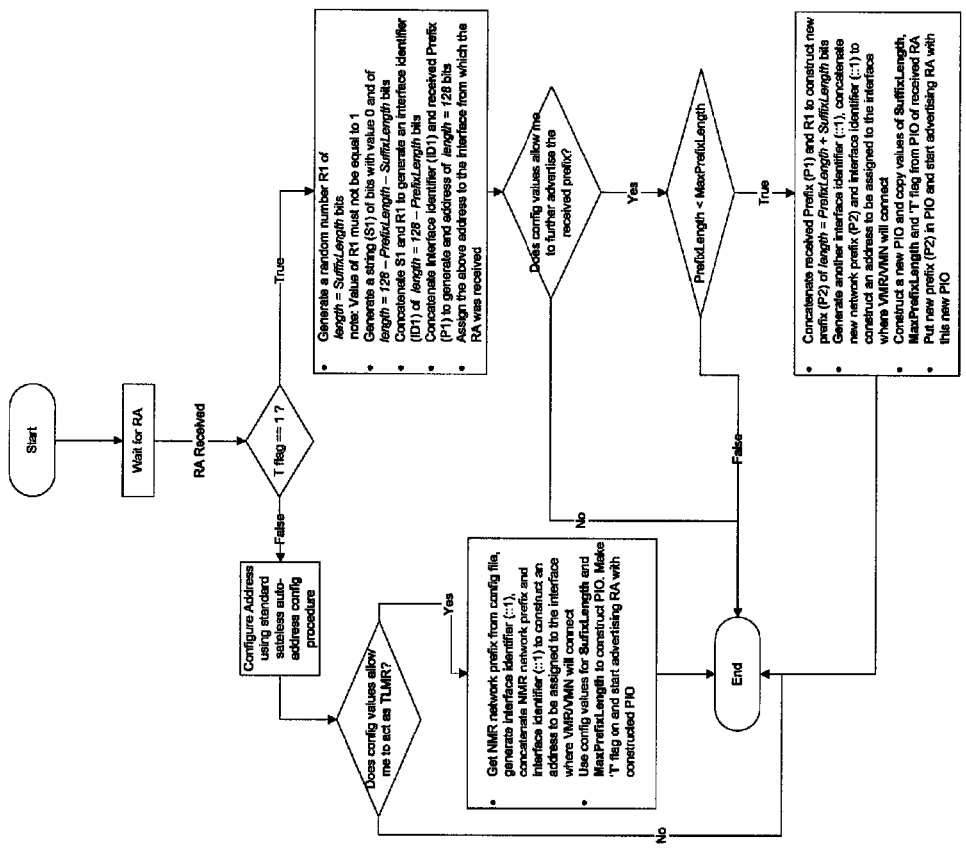
FIG. 10 shows a flow diagram of a method according to an embodiment of the present invention.

FIG. 10 shows a flow diagram of a method according to an embodiment of the present invention. According to FIG. 10, the flow of operations according to FIG. 6 is basically complemented by the flow of operations according to FIG. 7, thus resulting in a combined example method, in which an operation of detecting a network element's dedication as top-level or non-top-level network element by way of a check whether a T flag (e.g. received in a Router Advertisement message) is set to 1. For details thereof, reference is made to the above explanations.

Basically, embodiments of the present invention support a nested NEMO network architecture, where a top-level network element allows its VMRs to let their VMRs to connect e.g. to the Internet through the top-level network element. For this purpose, network prefix information are propagated to the nested nodes e.g. by Router Advertisement messages (RAs).

According to an embodiment of the present invention, there is provided a data structure being configured to meet the above-described requirements. Such a data structure comprises a network prefix and network prefix information including at least one of a top-level indication, a suffix length parameter and a maximum prefix length parameter. According to an embodiment of the present invention, such a data structure may also comprise a router advertisement message containing a network prefix and network prefix information including at least one of a top-level indication, a suffix length parameter and a maximum prefix length parameter.

Figure 11:
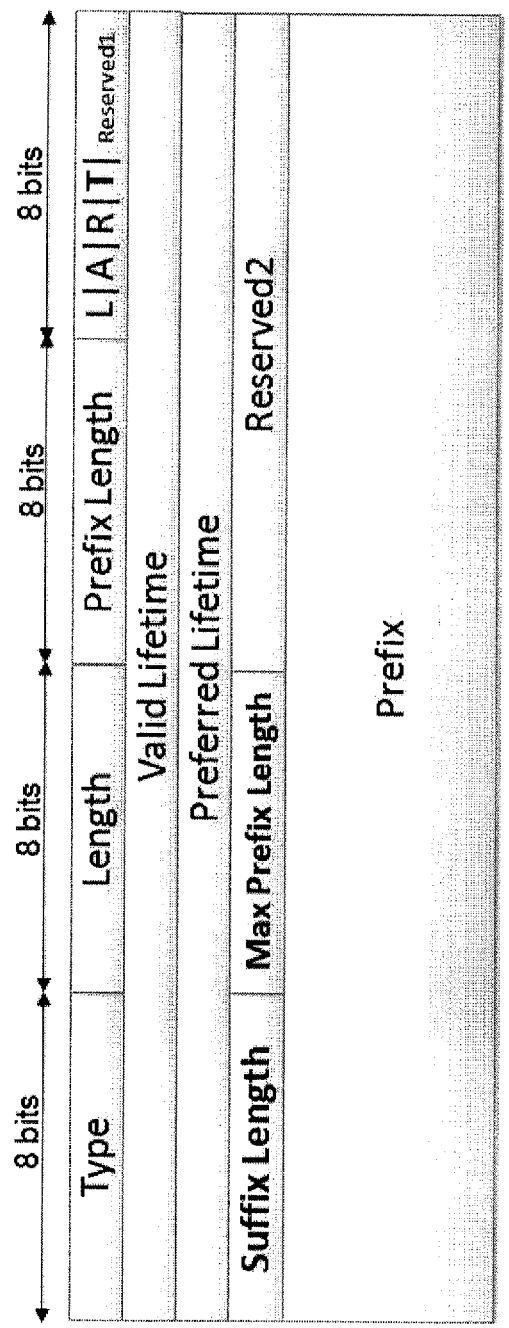
FIG. 11 shows a schematic representation of a data structure according to an embodiment of the present invention.

FIG. 11 shows a schematic representation of a data structure according to an embodiment of the present invention. According to FIG. 10, such a data structure represents an extension in a standard RA message used in IPv6 protocol to include
- information indicating a TLMR (or during initial establishment of nested (moving) network structure: indicating the intention of a node to be the TLMR for that nested (moving) network) (see "T flag" of FIG. 11),
- a maximum number of non-zero trailing bits in dynamic interface identifier to be concatenated with an advertised network prefix to make a unique address (see "Suffix Length" of FIG. 11), and/or
- a permission to propagate network prefix information to lower nested level (implicitly see "Max Prefix Length" of FIG. 11).

The upper four lines of data according to FIG. 11 represent a prefix information option (PIO) field according to an embodiment of the present invention.

In detail, when the top-level indication (i.e. T flag) is set, this flag indicates that recipient is in a nested network of a TLMR; this information can be helpful for the recipient in deciding whether it should itself act has a TLMR or not. When not set, this flag indicates that the recipient will connect at level 2 or higher in the role of a VMR or that the recipient will connect in the role of a MNN at a VMR). The suffix length parameter (i.e. "Suffix Length" field) is a 8 bit unsigned integer field indicating a maximum number of non-zero trailing bits in the dynamic interface identifier. When generating an interface identifier, only the number of trailing bits equal to 'suffix length' will be given a value by drawing a random number. 'Suffix Length' also shows the number of bits to be added to the received network prefix to build a new network prefix to be advertised in the immediate lower nested level. The maximum prefix length parameter (i.e. "Max Prefix Length" field) is a 8 bit unsigned integer field used to limit the network prefix information propagation to further nested levels. The recipient of this message can propagate this network prefix information to lower nested levels only if 'Prefix Length' is less than 'Max Prefix Length'. It is required that difference between 'Prefix Length' and 'Max Prefix Length' must be an integer multiple of 'Suffix Length' so that there are defined number of nested levels. The value in this field actually is used to control the depth of nested network or the number of nested levels.

It is to be noted that the representation of data in FIG. 11 is merely illustrative, and may as well be illustrated in horizontal orientation or in any other order. Furthermore, it is to be noted that a data structure according to embodiments of the present invention may contain none or any arbitrary combination of the depicted fields named Type, Length, Valid Lifetime, Preferred Lifetime, Reserved 1 and Reserved 2, as well as none or any arbitrary combination of flags L, A and R.

According to a facet of the present invention, embodiments thereof relate to an efficient routing of data packets, which may be based on addresses as assigned in line with the above explanations.

Figure 12:
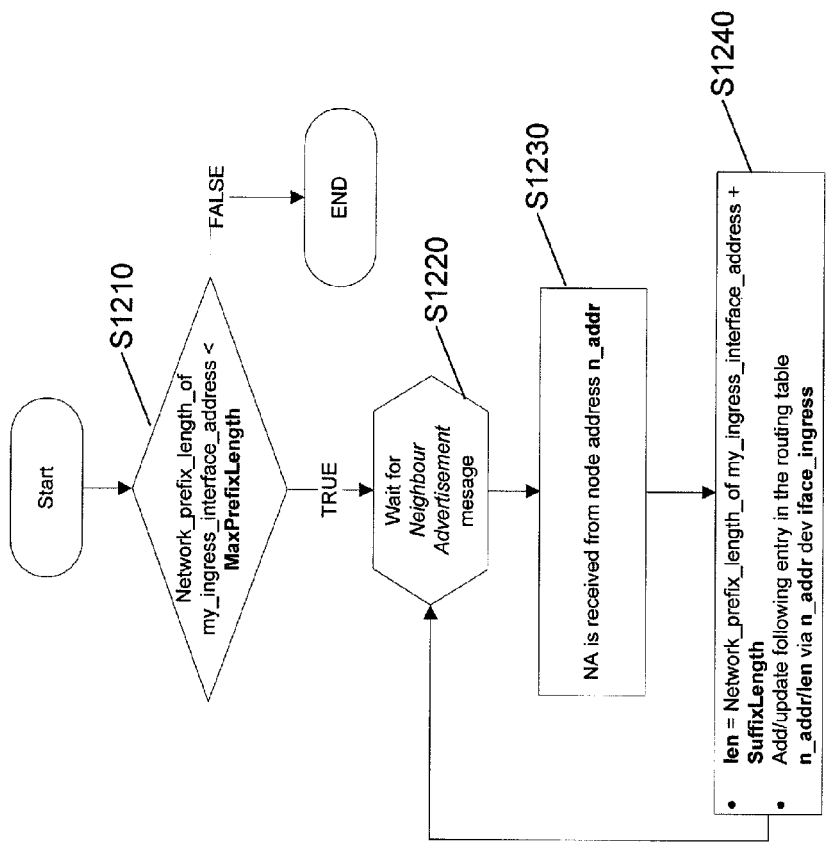
FIG. 12 shows a flow diagram of a method for providing efficient routing in a nested moving network environment according to an embodiment of the present.

FIG. 12 shows a flow diagram of a method for providing efficient routing in a nested moving network environment according to an embodiment of the present. The thus depicted method may for example be run in each mobile router of a multi-level network structure.

According to the embodiment of FIG. 12, it is assumed that network prefix information in accordance with those described above is present at the network element executing the depicted method. That is, there is an implicit operation (not shown) of retrieving network prefix information a maximum prefix length parameter and a suffix length parameter of a network prefix of the underlying multi-level network. In operation S1210 of FIG. 12, it is checked whether a network prefix length of an address of an ingress interface of the present network element is smaller than the maximum prefix length. If this is confirmed (TRUE in operation S1210), the network element in operation S1220 waits for an advertisement from a lower-level network element (e.g. a Neighbor Advertisement message according to FIG. 8). After receiving such an advertisement including an address of an egress interface of a lower-level network from an exemplary node address n_addr (operation S1230), a routing table of the network element is configured in operation S1240. Such a configuring is based on the received egress interface address n_addr and the previously retrieved suffix length parameter. According to the present embodiment as depicted, the routing table configuration of operation S1240 comprises an operation of calculating a length parameter on the basis of the network prefix length of the ingress interface address of said network element and said suffix length parameter, i.e. an addition of the values thereof, and an operation of adding and/or updating (depending on whether a corresponding routing table entry already exists) a routing table entry specifying that traffic having the received egress interface address as a network prefix of a length corresponding to said calculated length is to be routed to said received egress interface address via said ingress interface of said network element.

That is, stated in other words, a corresponding method according to the present invention comprises an operation of informing network elements not being dedicated as top-level or bottom-level network elements of a multi-level network to forward any traffic on their ingress interface having a source address from a network prefix of the multi-level network to their egress interface and not to tunnel such traffic.

For example, referring to FIG. 9, when a node (e.g. the rightmost node in nested level 1) configures an address (3ffe:400::2 of length 32) at its egress interface towards the top-level mobile router TLMR, it will send a Neighbor Advertisement message which will be received by the TLMR. With the help of this Neighbor Advertisement a routine running on the TLMR (in accordance with that of FIG. 12) will add a route to its routing table stating "All traffic packets with destination address belonging to 3ffe:400::/32 network prefix should be forwarded to 3ffe:400::2". In the same way, routing tables of all nested nodes and the TLMR will be developed, as is exemplarily shown in 13. Moreover, a Neighbor Cache of the node that receives a Neighbor Advertisement message will also be updated by the operating system to have a new entry for its neighboring node.

Figure 13:
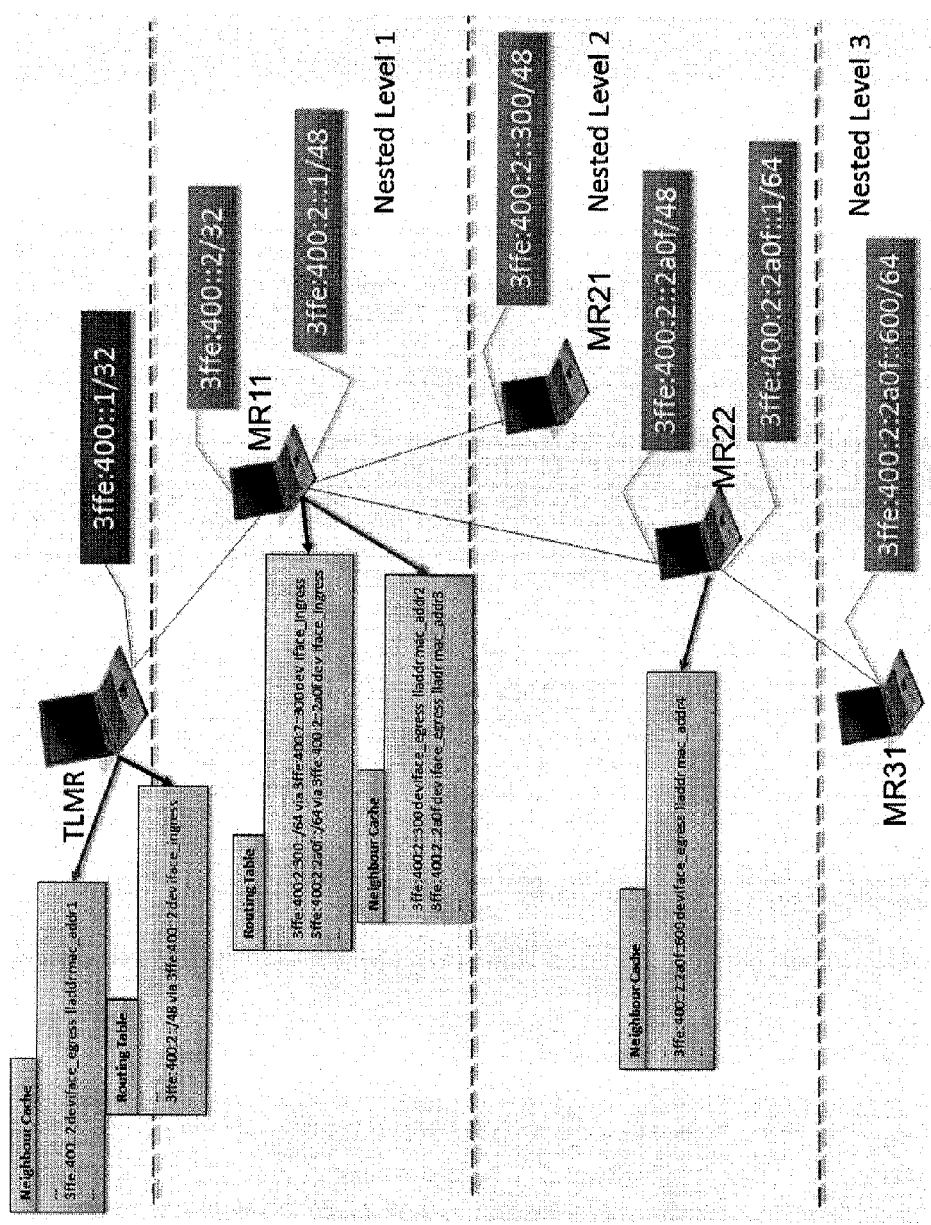
FIG. 13 shows an exemplary topology of a nested network environment with addresses assigned and routing tables configured according to an embodiment of the present invention.

FIG. 13 shows an exemplary topology of a nested network environment with addresses assigned and routing tables configured according to an embodiment of the present invention. It is to be noted that the figures does not show all entries in routing tables and neighbor caches, but only the relevant ones.

Referring to FIG. 13, if a packet arrives at the TLMR with a destination address being 3ffe:400:2:2a0f::600, the TLMR will route that packet to the address 3ffe:400::2 (of mobile router MR11) after consulting its routing table. The mobile router MR11 will consult its routing table and will forward that packet to an address 3ffe:400:2::2a0f (of mobile router MR22). The mobile router MR22 knows from its neighbor cache that the address 3ffe:400:2:2a0f::600 is its one-hop neighbor and simply forwards the packet to mobile router MR31.

Stated in other words, the functionality of a top-level network element according to an embodiment of the present invention is extended as described, e.g. by using an above-specified extended RA message. The functionality of VMRs and MNNs (that are connected directly to a TLMR) is also extended, e.g. with respect to a logic for any node which receives a modified RA message that includes a prefix information option where a "T flag" has been set, such that such a network element invokes proper routines to generate an address using the received network prefix information.

By means of extended functionalities for TLMR and/or VMRs/VMNs coping with the proposed hierarchical address assignment mechanism and the extended Router Advertisement messages, an improvement for providing network mobility (in particular of nested networks) may be achieved (e.g. by way of network layer approaches).

By virtue of above-described operations and functionalities, overhead in traffic routing in multi-level networks may be reduced, when data packets are forwarded from one network element (e.g. mobile router) to another. Further, data packets do not have to travel through all home agents of intermediate network elements (e.g. mobile routers), thus improving routing by bypassing such home agents.

The above-described operations and functionalities are applicable for present networks as well as for future developments thereof, such as e.g. further developments of 3G systems in terms of architecture enhancements for non 3G access and/or general packet radio service (GPRS) enhancements for evolved universal terrestrial radio access network (E-UTRAN) access. The above-described operations and functionalities may in this regard provide support for moving (nested) networks, wherein a top-level network element is a mobility endpoint, and not a terminal or user equipment. For above-referenced developments of 3G systems to cope with topologically correct addresses and network prefixes as described above, a terminal/user equipment or a top-level network element is assigned a corresponding address or prefix e.g. from a packet data network gateway (PDN GW).

For example, as regards architecture enhancements for non 3G access, this may be achieved during PDNGW/HA discovery and HoA configuration. As regards GPRS enhancements for E-UTRAN access, this may be achieved by a PDN gateway in which the functionality may be defined as follows: PDN GW functions include, among others, UE (now)/TLMR (future) IP address allocation to enable topological correct IP address assignments for VMNs/(nested) MR(s) connected to that TLMR (future).

Although embodiments of the present invention have been described mainly with reference to methods, procedures and functions up to here, corresponding embodiments of the present invention also cover respective apparatuses, network nodes, including both software and hardware thereof.

In the following, structural embodiments of the present invention are shown by way of block diagrams. In these block diagrams, for the sake of clarity, not all functional blocks needed for an operation of a corresponding apparatus are depicted, but only those relevant in view of the above-described functionalities. Further, it is to be noted that the block diagrams illustrate apparatuses according to embodiments of the present invention with a high level of detail, while there also exist embodiments not comprising all of the illustrated functional blocks. The solid arrows between superordinate functional blocks and the dashed lines between subordinate functional blocks are to represent an operational coupling there-between, which may be direct or indirect (i.e. with intermediate functional blocks) and which may be implemented in any conceivable manner, e.g. by wired or wireless links.

Figure 14:
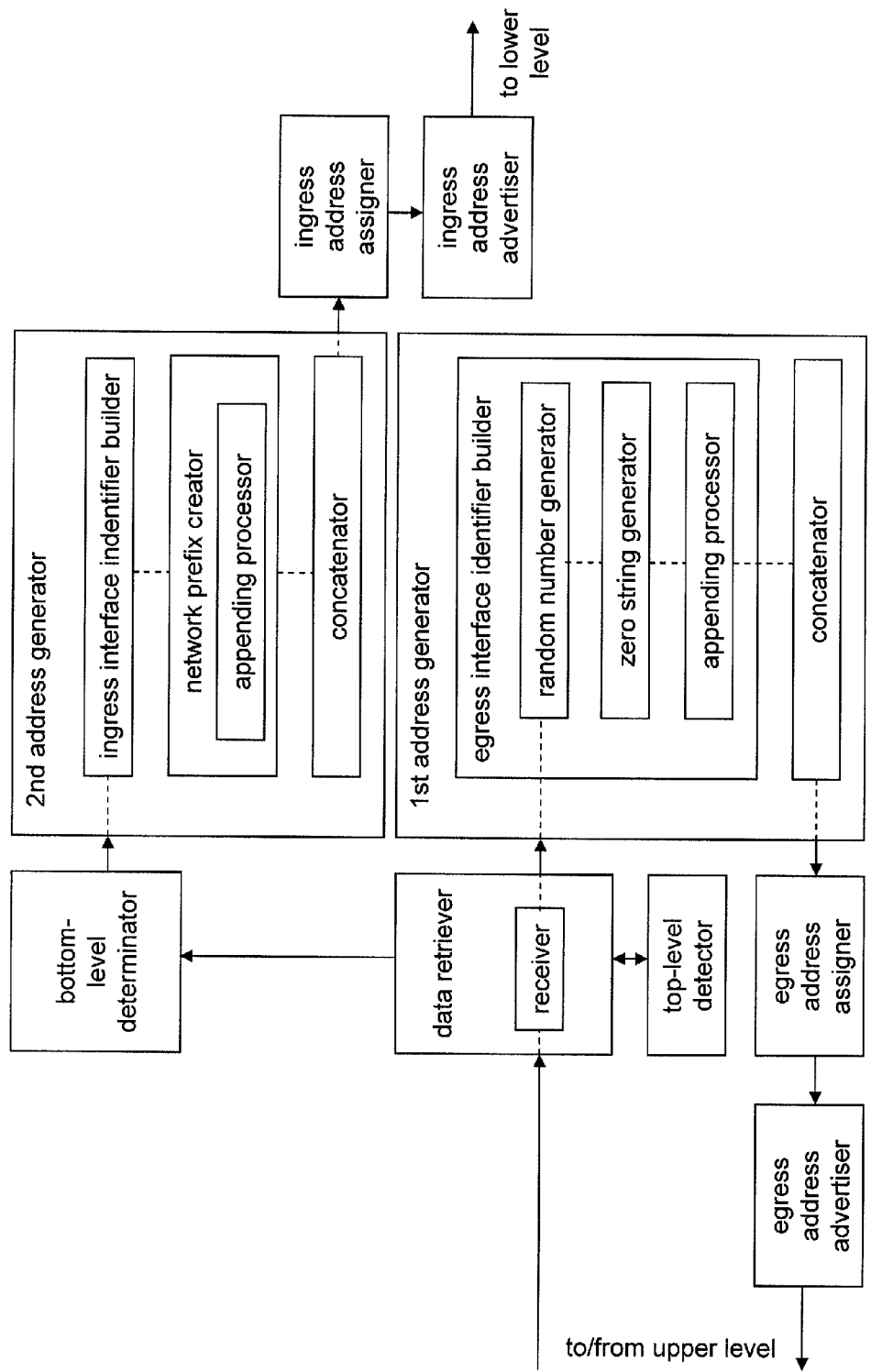
FIG. 14 shows a block diagram of an apparatus according to an embodiment of the present invention.

FIG. 14 shows a block diagram of an apparatus according to an embodiment of the present invention. The thus depicted apparatus may be implemented by or in a network element of intermediate level or bottom level of a nested network (e.g. VMR or VMN). The apparatus according to the embodiment of FIG. 14 is configured to execute the operations of any one of FIGS. 5 and 6.

In detail, a data retriever is configured to operate as means for retrieving according to operation S510 or S610, wherein a receiver is configured to receive an advertisement message such as an RA message from an upper level. A first address generator is configured to operate as means for generating an address according to operation S520 or S620. An egress interface identifier builder is configured to operate as means for building an egress interface identifier according to operation S621, wherein a random number generator is configured to operate according to operation S621a and a zero string generator is configured to operate according to operation S621b and an appending processor is configured to operate according to operation S621c. A concatenator of the first address generator is configured to operate according to operation S622. An egress address assigner is configured to operate as means for assigning a generated address to the egress interface according to operation S530 or S630. A top-level detector is configured to operate as means for detecting whether or not the executing apparatus is a top-level apparatus, as described above, and an egress address advertiser is configured to operate as means for advertising an assigned egress address, as described above.

A bottom-level determinator is configured to operate as means for determining whether or not the executing apparatus is allowed to further propagate a network prefix to a lower level. A second address generator is configured to operate as means for generating an address according to operation S640, wherein an ingress interface identifier builder is configured to operate according to operation S641, a network prefix generator is configured to operate according to operation S642 (e.g. having an appending processor configured to operate according to operating S642a) and a concatenator of the second address generator is configured to operate according to operation S643. An ingress address assigner is configured to operate as means for assigning a generated address to the ingress interface according to operation S650. An ingress address advertiser is configured to operate as means for advertising an assigned ingress address to a lower level, as described above.

Figure 15:
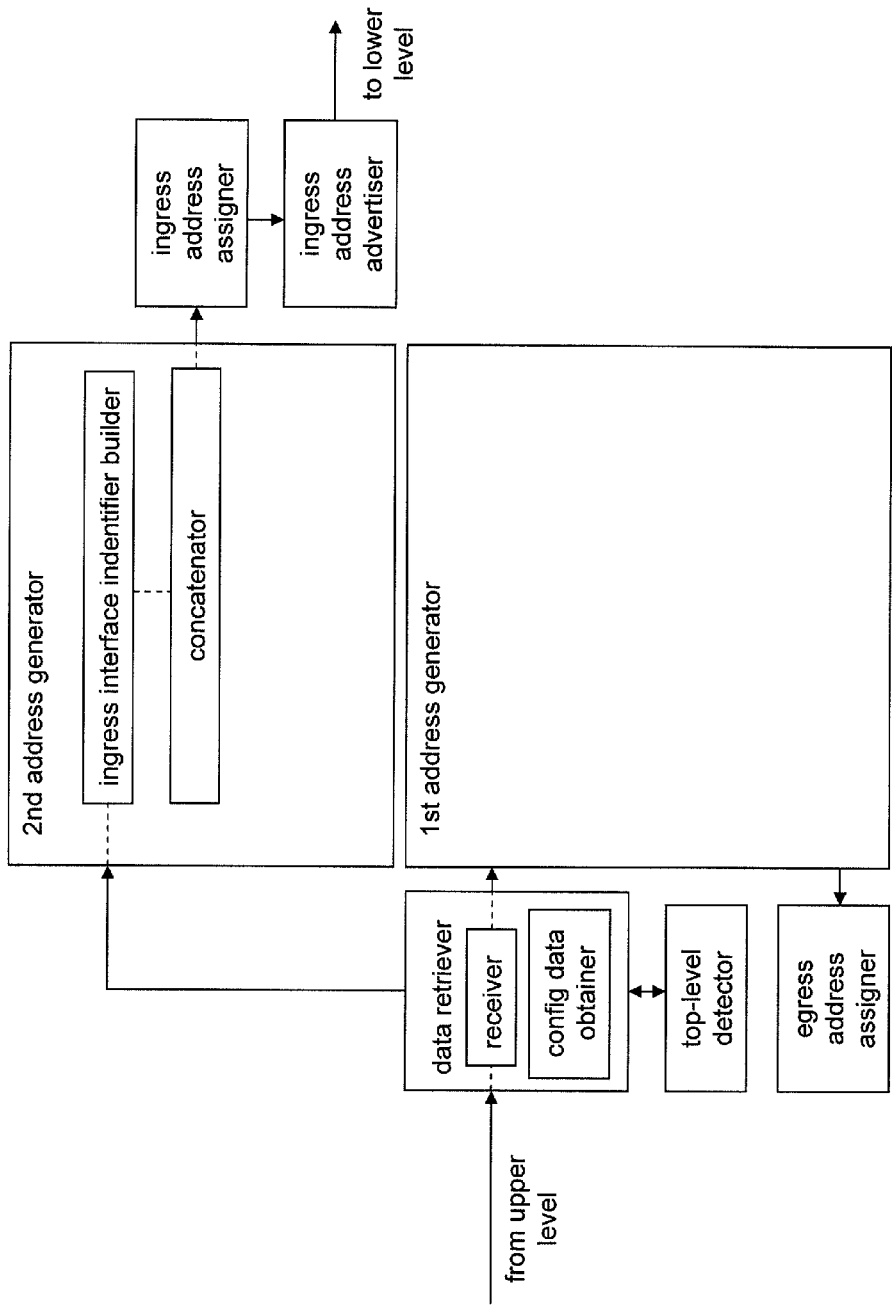
FIG. 15 shows a block diagram of another apparatus according to an embodiment of the present invention.

FIG. 15 shows a block diagram of another apparatus according to an embodiment of the present invention. The thus depicted apparatus may be implemented by or in a network element of top level of a nested network (e.g. TLMR). The apparatus according to the embodiment of FIG. 15 is configured to execute the operations of any one of FIGS. 5 and 7.

In detail, a data retriever is configured to operate as means for retrieving according to operation S510 or S710, wherein a receiver is configured to receive an advertisement message such as an RA message from an upper level and a configuration data obtainer is configured to obtain information to be retrieved from configuration data of the executing apparatus. A first address generator is configured to operate as means for generating an address according to operation S520 or S720. An egress address assigner is configured to operate as means for assigning the generated address to the egress interface according to operation S530 or S730. A second address generator is configured to operate as means for generating an address according to operation S740, wherein an ingress interface identifier builder is configured to operate according to operation S741 and a concatenator is configured to operate according to operation S742. An ingress address assigner is configured to operate as means for assigning a generator address to the ingress interface according to operation S750. An ingress address advertiser is configured to operate as means for advertising the assigned ingress address to a lower level according to operation S760, wherein specific functional blocks for executing operations S761, S762 and S763 are not shown in FIG. 15.

Figure 16:
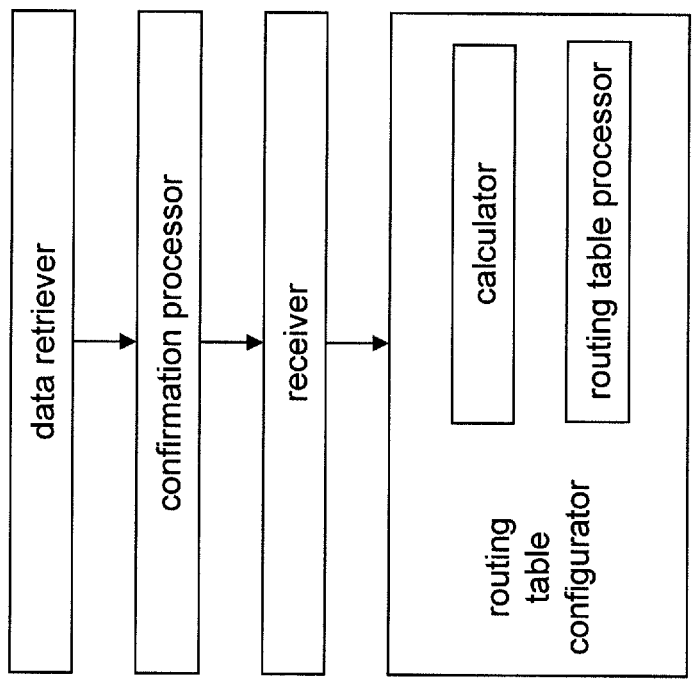
FIG. 16 shows a block diagram of still another apparatus according to an embodiment of the present invention.

FIG. 16 shows a block diagram of still another apparatus according to an embodiment of the present invention. The thus depicted apparatus may be implemented by or in a network element of any level of a nested network (e.g. VMR, VMN, TLMR). The apparatus according to the embodiment of FIG. 16 is configured to execute the operations of FIG. 12. It is to be noted that the apparatus of FIG. 16 may be combined with any one of the apparatuses of FIGS. 14 and 15 to form another apparatus according to an embodiment of the present invention.

In detail, a data retriever is configured to operate as means for retrieving required information, which is implicit to FIG. 12, as described above. A confirmation processor is configured to operate according to operation S1210, a receiver is configured to operate according to operation S1220 and S1230, and a routing table calculator is configured to operate according to operation S1240, wherein a calculator is configured to operate as means for calculating a length parameter and a routing table processor is configured to operate as means for adding and/or updating the routing table accordingly.

Any functions, methods and operations described above may be implemented by way of software and/or hardware.

In general, it is to be noted that respective functional elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Software in the sense of the present description comprises software code as such comprising code means for performing the respective functions, as well as software (or a computer program or a computer program product) embodied on a tangible medium such as a computer-readable storage medium having stored thereon a respective data structure or code portions or embodied in a signal or in a chip, potentially during processing thereof.

Generally, for the purpose of the present invention as described herein above, it should be noted that an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed lines but also circuits switched access technologies; access technologies may be distinguishable in at least two categories or access domains such as packet switched and circuit switched, but the existence of more than two access domains does not impede the invention being applied thereto, an access network may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user may experience services from an access network such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method of address assignment for a network element being operable in a multi-level network, comprising:
retrieving a network prefix of said multi-level network and network prefix information including at least one of a top-level indication, a suffix length parameter and a maximum prefix length parameter,
generating a first address in accordance with a topology of said multi-level network on a basis of said retrieved network prefix and network prefix information,
assigning said generated first address to an egress interface of said network element,
wherein, if said network element is not dedicated as a top-level network element of said multi-level network, said first address generating further comprises building an interface identifier of said egress interface, and
concatenating said built egress interface identifier and said retrieved network prefix, and
determining, on a basis of a length of said retrieved network prefix and said retrieved maximum prefix length parameter, whether or not said network element is dedicated as a bottom-level network element of said multi-level network.

2. The method according to claim 1, further comprising detecting, on a basis of said retrieved top-level indication, whether or not said network element is dedicated as a top-level network element of said multi-level network.

3. The method according to claim 1, wherein said building of said egress interface identifier comprises generating a random number of a length according to said retrieved suffix length parameter,
generating a string of zero values of a length according to a predetermined address length, a length of said retrieved network prefix and said retrieved suffix length parameter, and
appending said generated random number to said generated string of zero values.

4. The method according to claim 1, wherein, if said network element is not dedicated as a bottom-level network element of said multi-level network, said method further comprises
generating a second address in accordance with a topology of said multi-level network on the basis of said retrieved network prefix and network prefix information, and
assigning said generated second address to an ingress interface of said network element.

5. The method according to claim 4, wherein said second address generating further comprises
building an interface identifier of said ingress interface, said ingress interface identifier having a predetermined value,
creating another network prefix of a length according to a length of said retrieved network prefix and said retrieved suffix length parameter by appending a random number previously generated for egress interface address assignment to said retrieved network prefix, and
concatenating said built ingress interface identifier and said created another network prefix.

6. The method according to claim 1, further comprising:
advertising said generated first address assigned to said egress interface from said network element to an upper-level network element via said egress interface by sending an unsolicited neighbor advertisement message containing said assigned egress interface address.

7. The method according to claim 4, further comprising:
advertising said generated second address assigned to said ingress interface from said network element to at least one lower-level network element via said ingress interface by sending a router advertisement message containing said assigned ingress interface address, another network prefix, and network prefix information including said retrieved top-level indication, the suffix length parameter and the maximum prefix length parameter.

8. An apparatus comprising:
a data retriever configured to retrieve a network prefix of a multi-level network and network prefix information including at least one of a top-level indication, a suffix length parameter and a maximum prefix length parameter,
a first address generator configured to generate a first address in accordance with a topology of said multi-level network on a basis of said retrieved network prefix and network prefix information, and
an egress address assigner configured to assign said generated first address to an egress interface of said apparatus,
wherein, if said apparatus is not dedicated as a top-level apparatus of said multi-level network, said first address generator further comprises
an egress interface identifier builder configured to build an interface identifier of said egress interface, and
a concatenator configured to concatenate said built egress interface identifier and said retrieved network prefix; and
a bottom-level determinator configured to determine, on a basis of a length of said retrieved network prefix and said retrieved maximum prefix length parameter, whether or not said apparatus is dedicated as a bottom-level apparatus of said multi-level network.

9. An apparatus according to claim 8, further comprising:
a top-level detector configured to detect, on a basis of said retrieved top-level indication, whether or not said apparatus is dedicated as a top-level apparatus of said multi-level network.

10. The apparatus according to claim 8, wherein said egress interface identifier builder comprises a random number generator configured to generate a random number of a length according to said retrieved suffix length parameter,
- a zero string generator configured to generate a string of zero values of a length according to a predetermined address length, a length of said retrieved network prefix and said retrieved suffix length parameter, and
- an appending processor configured to append said generated random number to said generated string of zero values.

11. The apparatus according to claim 8, wherein, if said apparatus is not dedicated as a bottom-level apparatus of said multi-level network, said apparatus further comprises
- a second address generator configured to generate a second address in accordance with a topology of said multi-level network on the basis of said retrieved network prefix and network prefix information, and
- an ingress address assigner configured to assign said generated second address to an ingress interface of said apparatus.

12. The apparatus according to claim 11, wherein said second address generator further comprises
- an ingress interface identifier builder configured to build an interface identifier of said ingress interface, said ingress interface identifier having a predetermined value,
- a network prefix creator configured to create another network prefix of a length according to a length of said retrieved network prefix and said retrieved suffix length parameter, and
- a concatenator configured to concatenate said built ingress interface identifier and said created another network prefix,
- wherein said network prefix creator further comprises an appending processor configured to append a random number previously generated for egress interface address assignment to said retrieved network prefix.

13. The apparatus according to claim 8, further comprising:
- an egress address advertiser configured to advertise said generated first address assigned to said egress interface from said apparatus to an upper-level apparatus via said egress interface by sending an unsolicited neighbor advertisement message containing said assigned generated first address to the egress interface.

14. The apparatus according to claim 11, further comprising:
- an ingress address advertiser configured to advertise said generated second address assigned to said ingress interface from said apparatus to at least one lower-level apparatus via said ingress interface by sending a router advertisement message containing said assigned generated second address to an ingress interface, another network prefix, and network prefix information including said retrieved top-level indication, the suffix length parameter and the maximum prefix length parameter.

15. A method for a network element being operable in a multi-level network, comprising:
- retrieving network prefix information including a maximum prefix length parameter and a suffix length parameter of a network prefix of said multi-level network,
- confirming that a network prefix length of an address of an ingress interface of said network element is smaller than said maximum prefix length,
- receiving an advertisement of an address of an egress interface of a lower-level network element of said multi-level network, and
- configuring a routing table on a basis of said received egress interface address and said retrieved suffix length parameter, wherein said configuring comprises
- calculating a length parameter on a basis of the network prefix length of the ingress interface address of said network element and said suffix length parameter, and
- adding and/or updating a routing table entry specifying that traffic having the received egress interface address as a network prefix of a length corresponding to said calculated length parameter is to be routed to said received egress interface address via said ingress interface of said network element.

16. An apparatus being operable in a multi-level network, comprising:
- a data retriever configured to retrieve network prefix information including a maximum prefix length parameter and a suffix length parameter of a network prefix of said multi-level network,
- a confirmation processor configured to confirm that a network prefix length of an address of an ingress interface of said apparatus is smaller than said maximum prefix length,
- a receiver configured to receive an advertisement of an address of an egress interface of a lower-level apparatus of said multi-level network, and
- a routing table configurator configured to configure a routing table on a basis of said received egress interface address and said retrieved suffix length parameter, wherein said routing table configurator comprises
- a calculator configured to calculate a length parameter on a basis of the network prefix length of the ingress interface address of said apparatus and said suffix length parameter, and
- a routing table processor configured to add and/or update a routing table entry specifying that traffic having the received egress interface address as a network prefix of a length corresponding to said calculated length parameter is to be routed to said received egress interface address via said ingress interface of said apparatus.

* * * * *